(12) United States Patent
Rogan et al.

(10) Patent No.: US 8,118,598 B2
(45) Date of Patent: Feb. 21, 2012

(54) EDUCATIONAL INTERACTIVE GAMES

(75) Inventors: Philip A. Rogan, Bozeman, MT (US);
David A. Gipp, Bozeman, MT (US);
Douglas W. Herman, Sammamish, WA (US)

(73) Assignee: Cashflow Technologies, Inc., Scottsdale, AZ (US)

( * ) Notice: Subject to any disclaimer, the term of this patent is extended or adjusted under 35 U.S.C. 154(b) by 24 days.

(21) Appl. No.: 12/546,467

(22) Filed: Aug. 24, 2009

(65) Prior Publication Data

US 2009/0317775 A1 Dec. 24, 2009

Related U.S. Application Data

(63) Continuation of application No. 11/001,160, filed on Nov. 30, 2004, now abandoned, which is a continuation of application No. 10/326,497, filed on Dec. 20, 2002, now abandoned.

(60) Provisional application No. 60/420,083, filed on Oct. 18, 2002.

(51) Int. Cl.
*G09B 19/18* (2006.01)
(52) U.S. Cl. ........ 434/107; 434/110; 434/128; 434/188; 434/322; 434/350
(58) Field of Classification Search .............. 434/107, 434/110, 128, 188, 322, 350
See application file for complete search history.

(56) References Cited

U.S. PATENT DOCUMENTS

| | | | |
|---|---|---|---|
| 2,297,011 A | 9/1942 | Mooney | |
| 3,807,739 A | 4/1974 | Henley et al. | |
| 4,012,046 A | 3/1977 | Liket | |
| 4,109,918 A | 8/1978 | Mele et al. | |
| 4,279,422 A | 7/1981 | Shaw | |
| 4,363,489 A | 12/1982 | Chodak et al. | |
| 4,378,942 A | 4/1983 | Isaac | |
| 4,522,407 A | 6/1985 | Hatherley | |
| 4,538,816 A | 9/1985 | Figueroa | |
| 4,840,382 A | 6/1989 | Rubin | |
| 4,890,844 A | 1/1990 | Weiss | |
| 4,932,668 A | 6/1990 | Stewart | |
| 4,955,616 A | 9/1990 | Ingalls | |
| 5,056,792 A | 10/1991 | Helweg-Larson et al. | |
| 5,071,135 A | 12/1991 | Campbell | |

(Continued)

FOREIGN PATENT DOCUMENTS

CA 1258689 8/1989

(Continued)

OTHER PUBLICATIONS

Sierra, Hoyle Classic Games manual, Jan. 24, 1998.*

(Continued)

*Primary Examiner* — Kang Hu
(74) *Attorney, Agent, or Firm* — Snell & Wilmer L.L.P.

(57) ABSTRACT

An educational interactive game of the invention includes a system for teaching financial skills to players, and in particular, children in the context of an interactive electronic game. Each player is initially provided a predetermined amount of periodic earned income, periodic expenses and a predetermined amount of cash on hand. These items are represented by corresponding indicia on an electronic display. An object of the game is for a player to generate passive income greater than the player's expenses by encountering game events that provide a player the opportunity to make financial choices to affect the desired outcome.

7 Claims, 22 Drawing Sheets

U.S. PATENT DOCUMENTS

| | | | |
|---|---|---|---|
| 5,139,269 | A | 8/1992 | Peterson |
| 5,205,997 | A | 4/1993 | Knowles |
| 5,253,857 | A | 10/1993 | Ballestrazzi et al. |
| 5,318,447 | A | 6/1994 | Mooney |
| 5,429,373 | A | 7/1995 | Chelko et al. |
| 5,826,878 | A | 10/1998 | Kiyosaki et al. |
| 6,029,159 | A | 2/2000 | Zorba et al. |
| 6,032,957 | A | 3/2000 | Kiyosaki et al. |
| 6,062,862 | A | 5/2000 | Koskinen |
| 6,106,300 | A | 8/2000 | Kiyosaki et al. |
| 6,199,030 | B1 | 3/2001 | Stone |
| 6,236,955 | B1 | 5/2001 | Summers |
| 6,321,205 | B1 | 11/2001 | Eder |
| 6,336,094 | B1 | 1/2002 | Ferguson et al. |
| 6,375,466 | B1 | 4/2002 | Juranovic |
| 6,408,263 | B1 | 6/2002 | Summers |
| 6,622,003 | B1 | 9/2003 | Denious et al. |
| 6,634,950 | B2 | 10/2003 | Yoshimi et al. |
| 6,709,330 | B1 | 3/2004 | Klein et al. |
| 6,729,884 | B1 | 5/2004 | Kelton et al. |
| 6,745,150 | B1 | 6/2004 | Breiman |
| 6,745,170 | B2 | 6/2004 | Bertrand et al. |
| 6,764,077 | B1 | 7/2004 | Miravete |
| 6,767,210 | B2 | 7/2004 | Joffe |
| 6,890,179 | B2 | 5/2005 | Rogan et al. |
| 2001/0027430 | A1 | 10/2001 | Sabourian |
| 2002/0013762 | A1 | 1/2002 | Yoshimi et al. |
| 2002/0091608 | A1 | 7/2002 | Odegaard et al. |
| 2003/0162159 | A1 | 8/2003 | Sheehan |
| 2004/0081942 | A1 | 4/2004 | Resnick |

FOREIGN PATENT DOCUMENTS

| | | |
|---|---|---|
| EP | 0298727 | 1/1989 |
| EP | 0382369 | 8/1990 |
| GB | 801964 | 9/1958 |
| GB | 1432761 | 4/1976 |
| GB | 2193900 | 2/1988 |
| GB | 2196263 | 4/1988 |

OTHER PUBLICATIONS http://www.holisticpage.com/au/cashflow for kids, release date Jan. 1, 2001.*

USPTO; Office Action dated May 6, 1999 in U.S. Appl. No. 09/177,723.

USPTO; Notice of Allowance dated Oct. 8, 1999 in U.S. Appl. No. 09/177,723.

USPTO; Notice of Allowance dated Dec. 21, 1999 in U.S. Appl. No. 09/353,910.

USPTO; Office Action Restriction dated Jan. 5, 2004 in U.S. Appl. No. 10/267,249.

USPTO; Office Action dated May 5, 2004 in U.S. Appl. No. 10/267,249.

USPTO; Notice of Allowance dated Nov. 9, 2004 in U.S. Appl. No. 10/267,249.

USPTO; Office Action dated Aug. 14, 2007 in U.S. Appl. No. 10/830,836.

USPTO; Final Office Action dated Feb. 8, 2008 in U.S. Appl. No. 10/830,836.

USPTO; Advisory Action dated Jun. 25, 2008 in U.S. Appl. No. 10/830,836.

USPTO; Notice of Allowance dated Nov. 13, 2009 in U.S. Appl. No. 10/830,836.

USPTO; Notice of Allowance dated Mar. 17, 2010 in U.S. Appl. No. 10/830,836.

USPTO; Office Action dated Jan. 19, 2010 in U.S. Appl. No. 12/538,815.

USPTO; Final Office Action dated Jun. 29, 2010 in U.S. Appl. No. 12/538,815.

USPTO; Office Action dated Apr. 18, 2011 in U.S. Appl. No. 12/538,815.

USPTO; Office Action dated Feb. 17, 2011 in U.S. Appl. No. 12/546,467.

USPTO; Notice of Allowance dated Nov. 26, 2010 in U.S. Appl. No. 12/710,205.

PCT; International Search report dated Jun. 20, 2005 in Application No. PCT/US2004/012621.

CA; Office Action dated Nov. 14, 2002 in Application No. 2,271,909.

MY; Examination Report dated Aug. 10, 2004 in Application No. PI 97005467.

NZ; Examination Report dated Apr. 5, 2002 in Application No. 516448.

EP; Office Action dated Apr. 17, 2008 in Application No. 00 948 621.8.

EP; European Search Report dated May 17, 2005 in Application No. 00 948 621.8.

MY; Examination Report dated Sep. 28, 2007 in Application No. PI 20041514.

KR; Office Action dated Jul. 31, 2004 in Application No. 2002-7000998.

KR; Office Action dated Aug. 29, 2002 in Application No. 1999-7004319.

EP; Office Action dated Nov. 29, 2006 in Application No. 97 952 187.8.

Malik, S., Artificial Stock Market for Testing Price Prediction Models. 2004 2nd International IEEE Conference on Intelligent Systems. Proceeding (IEEE Cat. No. 04EX791). p. 75-80 vol. 3.

McAllister, Pricing Short Leases and Break Clauses Using Simulation Technology. Journal of Property Investment & Finance. V19n4 pp. 361-374, 2001.

Marmiroli, M. et al., Experience with Running Market-Simulation Studies. 2003 IEEE Power Engineering Society General Meeting (IEEE Cat. No. 03CH37491). 377 vol. 1.

Dictionary of Business Terms, Third Edition, 2000, definition of generally accepted accounting principles, p. 285.

Wikipedia, 1991, http://en.wikipedia.org/wiki/Elasticity_%28economics%29.

* cited by examiner

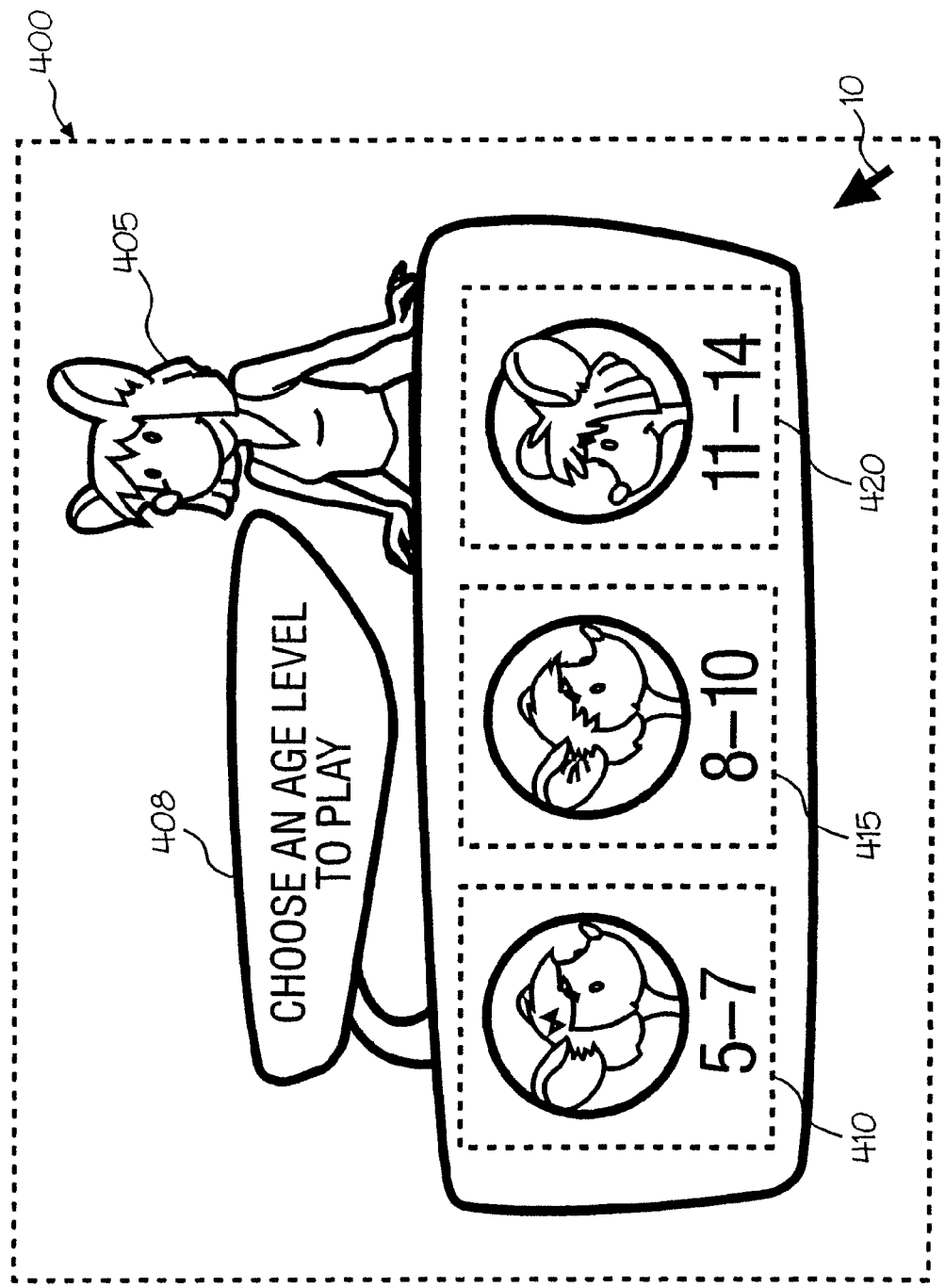

EDUCATIONAL INTERACTIVE GAMES

CROSS-REFERENCE TO RELATED APPLICATIONS

This application is a continuation of and claims priority to U.S. patent application Ser. No. 11/001,160, filed on Nov. 30, 2004 now abandoned, by inventors Philip A. Rogan, David A. Gipp, and Douglas W. Herman, which is a continuation of and claims priority to U.S. patent application Ser. No. 10/326,497, filed on Dec. 20, 2002 now abandoned, by inventors Philip A. Rogan, David A. Gipp, and Douglas W. Herman, which claims benefit of priority under 35 U.S.C. §119(e) from Application Ser. No. 60/420,083, filed on Oct. 18, 2002, by inventors Philip A. Rogan, David A. Gipp, and Douglas W. Herman, the foregoing Applications hereby incorporated by reference in their entirety.

COPYRIGHT NOTICE AND AUTHORIZATION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

1. Field of the Invention

The present invention relates to interactive games and methods for teaching. More particularly, but not exclusively, the invention relates to teaching others through the use of digital interactive media.

2. Related Art

U.S. Pat. Nos. 5,826,878, and 6,032,957 to Kiyosaki et al., and incorporated herein by their reference, disclose respective methods and games for teaching personal finance, investing and accounting (collectively and individually referred to herein as "financial principles") to others. These games and methods have proven to be successful from both educational and commercial perspectives. These patents disclose board games and associated methods in which players learn and reinforce financial principles through game play using inanimate objects such as various game cards, boards, tokens and game pieces.

U.S. Pat. No. 6,106,300, also to Kiyosaki et al. and incorporated herein by its reference, discloses a mechanism for teaching financial skills to players, and in particular, to children, in the context of a game. This patent discloses not only the use of a board game but also an electronic implementation of the game that can be actuated or visualized on a display.

Video games and other types of "interactive" electronic media have become a primary form of entertainment in the modern world. As used throughout this disclosure, "interactive" means an environment in which audio, video, activities and/or other actions are automatically performed in response to a student, game player, or other type of participant's input. The use of interactive media could be important in various educational products or methods. Accordingly, it would be beneficial to utilize interactive media to teach and/or educate others.

Additionally, there are significant costs associated with conventional games, methods and systems used for education. For example, the financial and environmental costs of producing, distributing and using educational and gaming materials such as, paper (e.g., training materials or playing cards), cardboard (e.g., book covers or game boards and associated packaging), plastic (e.g., game pieces, spinners, dice) can be significant. Moreover, there can be significant costs associated with the design, manufacture, warehousing and shipping such materials. It would be beneficial to have educational products and methods that do not require as great an investment in, or consumption of, these resources.

Moreover, conventional systems for educating others have been traditionally associated with person-to-person contact and/or required one's presence in a particular physical location, e.g., instruction in a classroom or playing a board game in a location where another person is present. It would be advantageous to provide methods and systems for providing education in a digital medium so that students or participants could learn and be educated at any location with only minimal investment or infrastructure.

SUMMARY OF THE INVENTION

The present invention addresses one or more of the foregoing concerns by providing interactive active electronic media, and tools therefor, that facilitate a user learning one or more financial lessons. In one example embodiment the lessons correspond to mathematics, accounting, personal finances and business opportunities. As used herein, the term "lesson" means learning instruction related to a selected subject matter. A "curriculum" is a set of lessons directed toward a selected subject matter.

The invention includes a system for teaching financial skills to players, and children in particular, in the context of an interactive electronic game. Each player is initially provided a periodic earned income, periodic expenses and an amount of cash on hand. These items are represented by corresponding indicia on an electronic display. One object of the game is for a player to generate passive income greater than the player's expenses by encountering game events which provide the player the opportunity to make financial choices to affect a desired outcome.

The game comprises a plurality of electronically displayed indicia including indicia representing an animated player character, indicia representing a financial statement associated with each player, indicia representing a money changing selector, indicia representing a one or more game events, and indicia representing a random event selection mechanism. The game may further include electronically displayed indicia representing game control features, which may include controls for selecting one or more of the following options relating to user help, printing, saving, parental information, and quitting the game.

The game events may relate to at least one of passive income, expenses, assets and liabilities of the players and preferably include opportunities to generate passive income by purchasing income-producing assets. The financial statement may include modifiable indicia representing units of passive income, units of periodic expenses, assets and liabilities and units of earned income for the player associated with the financial statement.

The indicia representing a money changer/selector preferably includes indicia representing an amount of cash on hand and player modifiable indicia representing currency denominations for selecting to pay expenses and making change.

Also disclosed herein are interactive games using one or more animated characters for teaching financial principles. In a preferred embodiment, select animated characters provide advice and/or commentary on financial principles including income types and debts, among others.

The interactive game according to the invention may, in order for younger children to learn financial principles, not use financial terms but instead use themes analogous to financial principles.

BRIEF DESCRIPTION OF THE DRAWING

Additional aspects, features and advantages of the present invention will become apparent from the following description of the invention in reference to the appended drawings in which like reference numerals denote like elements and in which:

FIG. 4 illustrates indicia for selecting a level of play in accordance with the method for selecting a level of play described in reference to FIG. 3;

DETAILED DESCRIPTION OF THE PREFERRED EMBODIMENTS

A game in accordance with the present invention preferably teaches money management including how to develop passive income and/or investment techniques. Additionally, the game may teach students the nature of salary income (as used herein, salary income means revenue obtained from working), income assets (as used herein, this is defined as things that generate revenue without requiring work), liabilities (as used herein, this is defined as things that require the player to expend revenue), how to earn more money through acquisition of income assets and basic accounting and money exchange skills. In general, each player encounters game events in turn. The player's cash on hand and/or financial statement are adjusted based upon each game event. The game is preferably structured so that the first player to achieve a passive income greater than his or her expenses (or liabilities) wins.

An interactive educational game according to the invention may teach basics of money management and money exchange without requiring pencil, paper, tokens, boards, books, and paper money by employing electronically displayed visual representations of units of respective financial status factors including earned income, passive income, expenses, assets and liabilities. The electronically displayed visual representations have distinguishing characteristics from one another, including for example, shape, size and/or color. Additionally, the educational interactive game preferably includes visually coordinated (e.g., color/shape coded) event designators to facilitate association of financial factors with game events.

Figure 1:
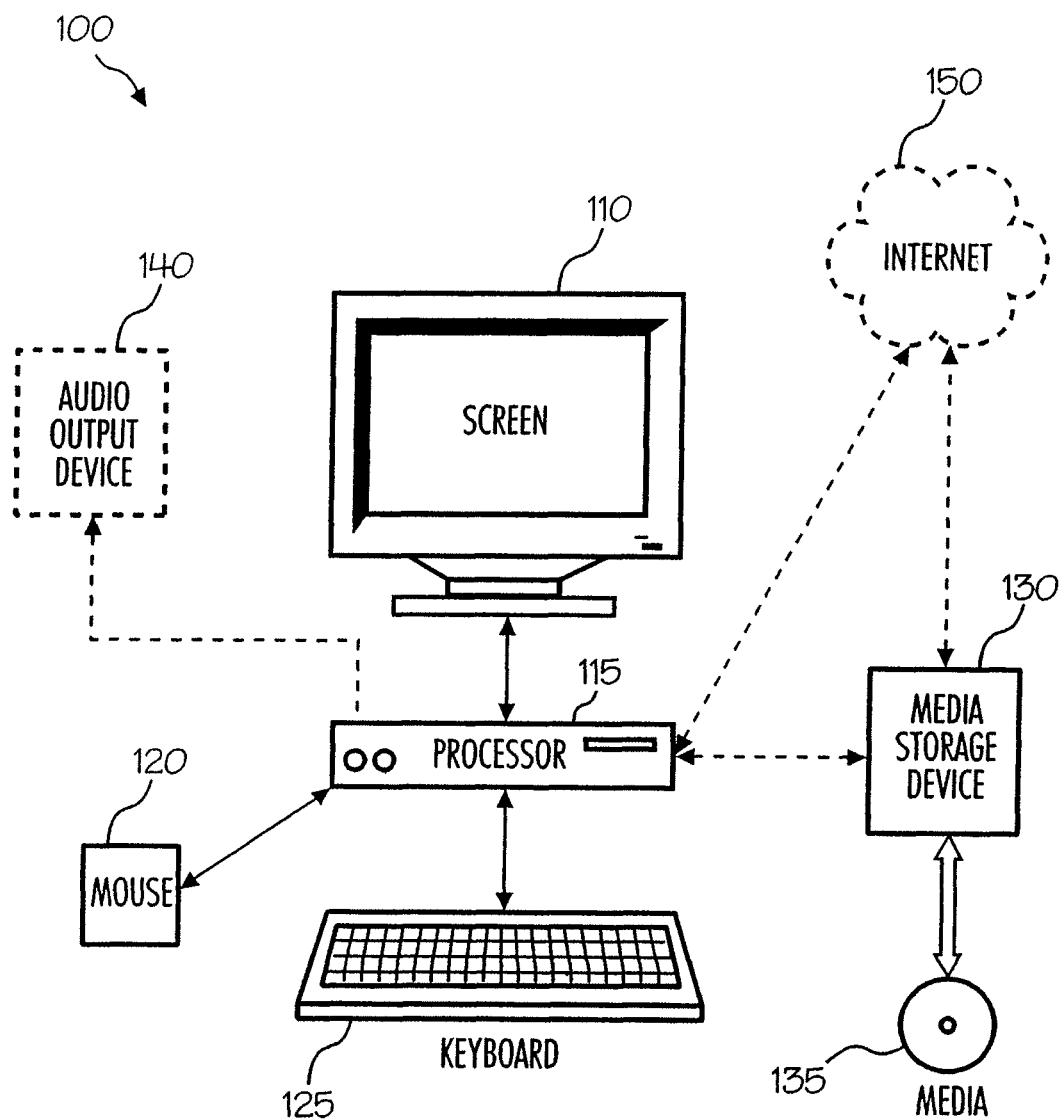
FIG. 1 is a block diagram of a system for interactive educational games according to one embodiment of the invention.

Referring to the block diagram of FIG. 1, one preferred example of an educational interactive game system 100 of the present invention includes screen 110, processor 115, one or more input devices 120, 125, media storage 130, 135 and optionally, audio output device 140 and/or network 150.

Screen 110 serves the purpose of facilitating display of visual game indicia to a game player. Screen 110 may be any type of device or combination of devices suitable for serving this purpose including a CRT, LCD, LED display, projector screen and accompanying projector, plasma display and so on.

Processor 115 generates visual and/or audible game indicia based on the media stored in media storage 130, 135 including processing information to output to screen 110 for displaying the visual game indicia; processing user input from input device 120, 125, updating the information for output to screen 110 based on user input; and retrieving and/or reading information from media storage/reader 130, 135 for generating and processing visual, and optionally audible, game information. Processor 115 may also control communications between various system components and optionally controls: (i) output information to media storage 130, 135 to save game information if desired or a printer (not shown); and/or (ii) process information for outputting audible game information to audio output device 140 (if present). Processor 115 may be any single device or combination of devices capable of performing these functions including one or more microprocessors, micro-controllers, programmable logic arrays, and optionally any respective processing peripheral components such as RAMS, ROMS, data buses, interfaces, power supplies, and/or cabling for accomplishing the same.

Input device 120, 125 allows a player to provide interactive input in response to game indicia displayed on screen 110 and/or audible indicia output from audio device 140. Input device 120, 125 may be any single device or combination of devices capable of performing this function including one or more of the following: a keyboard, a mouse, a microphone, a touch screen, interactive motion detector sensors (e.g., virtual reality sensor components), a joystick, a gamepad and so on. In one preferred embodiment, a mouse or joystick 120 is used in conjunction with a keyboard 125.

Media storage 130, 135 functions to provide information to processor 115 for processing and outputting visual and/or audible information to the user and to provide information regarding game sequencing and game control. Media storage 130, 135 may be any device or medium for performing these functions (or combination thereof) including an electronic media reading and/or writing device for retrieving and storing game information, a media storage medium such as a magnetic disk, an optical disk or the like which may be read by an electronic media reading device, and/or any combination of the two. Media storage 130, 135 may be connected to processor 115 directly, for example via a bus, parallel port, or USB connection, or remotely, for example via optional network 150, such as a LAN or WAN. With remote connection via network 150, media storage 130, 135 may further include its own respective processing device (not shown) to facilitate communications with processor 115, for example, a web server, database server, or other type of network processing device.

Optional audio output device 140 functions as a transducer to convert electrical audio information output by processor 115 based on information from media storage 130, 135, into physical sound waves to output audible game information to a player. Device 140 may be any single device or combination of devices to accommodate this function including one or more personal computer speakers, auxiliary powered speakers, headphones, or mobile processing device speakers (e.g., cell phone, or PDA speaker).

System 100 may be an existing standalone processing device such as a personal computer, laptop, palm computer, personal digital assistant, cell phone, hand-held game, electronic board game, or video game system and accompanying screen that is suitable for running the interactive gaming software of the present invention. Alternatively, system 100 may be a network-based system having distributed components interconnected through network 150. In one embodiment of a distributed system 100, network 150 is the Internet.

Figure 2:
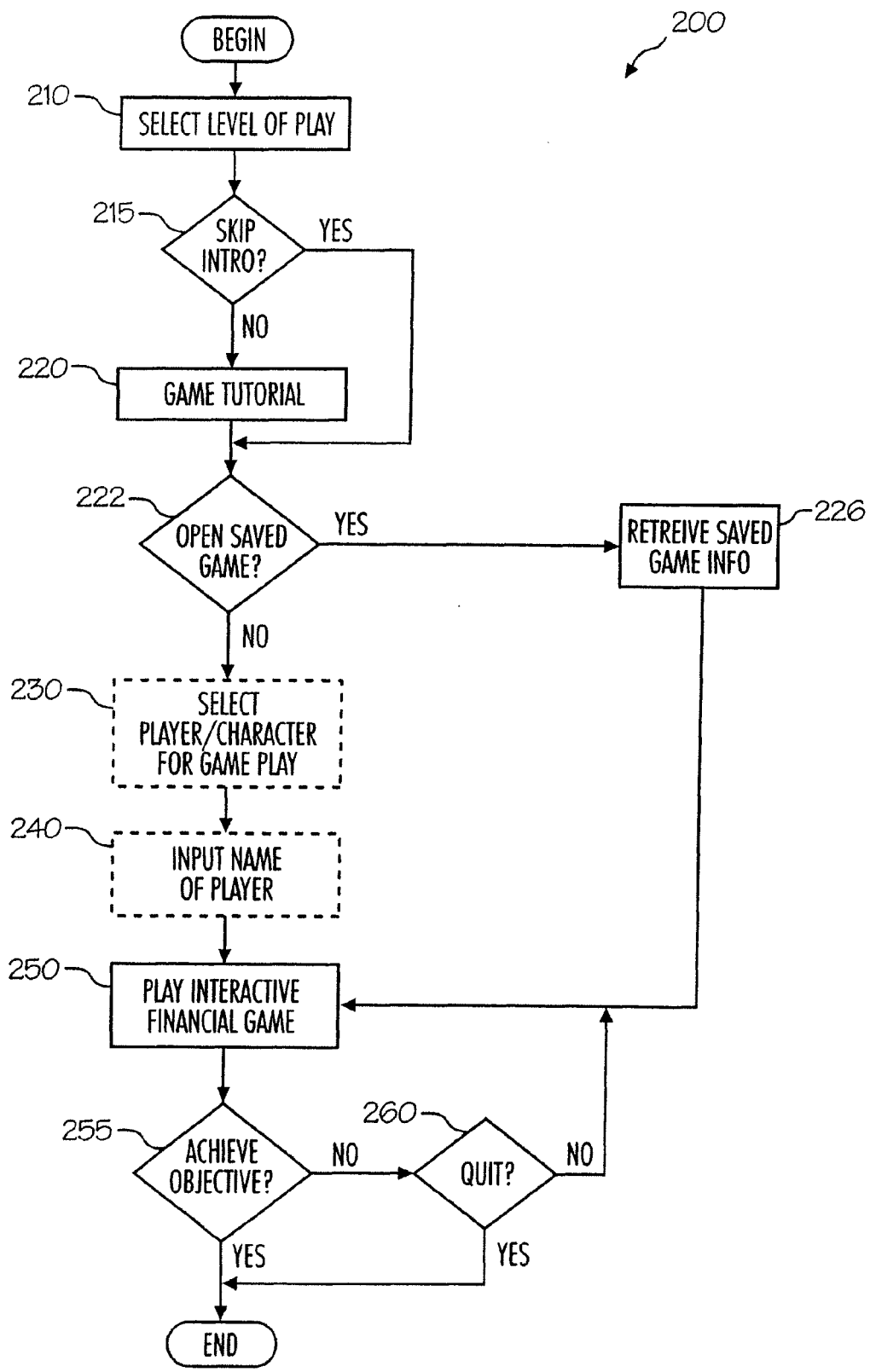
FIG. 2 is a flow diagram of a method for interactive education according to one embodiment of the invention.

Referring to FIG. 2, an overall method 200 for an educational interactive game may include, from a user perspective, selecting 210 a level of game play; receiving 220 a tutorial about financial concepts involved in the level of game play selected; optionally, selecting 230 a player/character for game play; optionally, inputting 240 a name for the player or player character; and playing 250 the educational interactive financial game until an objective is achieved 255 or the player quits 260. Method 200 may further include a player retrieving 222, 226 information from a previously saved game as opposed to creating and naming a new character for game play.

Figure 3:
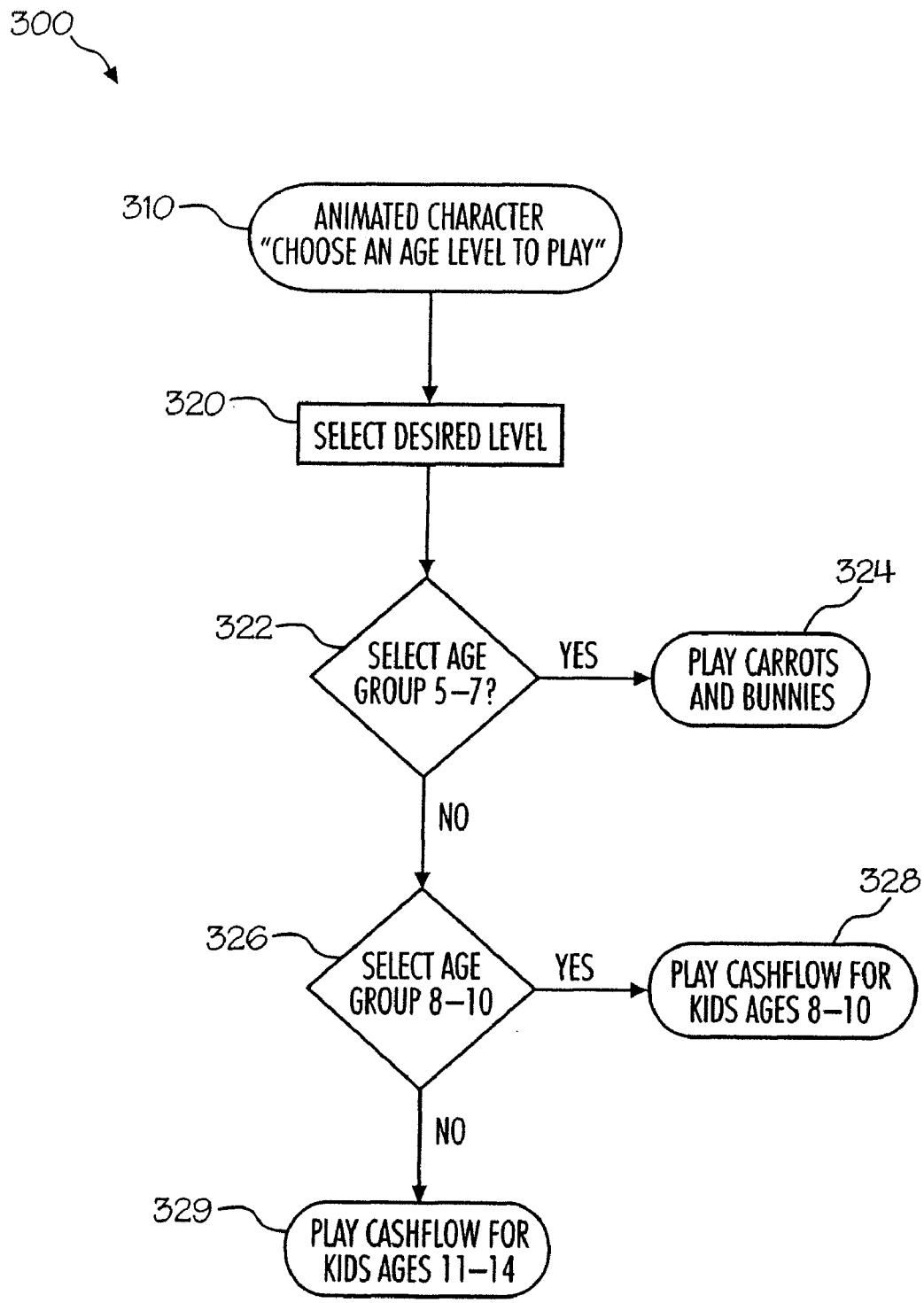
FIG. 3 is a flow diagram of a method for selecting a level of play according to one embodiment of the invention.

Turning to FIGS. 3-4, a method 300 and corresponding electronically displayed indicia 400 for selecting a level of game play (action 210; FIG. 2) according to one embodiment of the invention may include an animated character 405 asking (action 310) the game player to choose a level to play. Animated character 405 may present textual indicia 408 and most preferably, accompanying audible instructions to the player to accomplish this end. In one embodiment, an age level of the game player is used for categorizing the levels of play available for a player to select. However, any level-distinguishing criteria could also be used such as grade levels, easy, medium and difficult skill levels and so on.

If a player desires to open a previously saved game, method 300 may not be performed and indicia 400 may not be displayed to a user since the user may have already selected a level of play and/or character prior to saving the game.

Notwithstanding, if the player is selecting a level of play, in preferred embodiments, the player will be presented with various skill level categorizing indicia 410, 415 and 420 to enable a player to select one of several available levels of play, for example, by moving a cursor 10 over the desired area and clicking with a mouse (e.g., 120; FIG. 1) or entering a corresponding digit or arrow selection using a keyboard (e.g., 125; FIG. 1) to select a level of play corresponding to indicia 410, 415 and 420.

In one embodiment, the player is given three levels of educational interactive game play from which to choose, a first level (represented by indicia 410 as being suitable for ages five through seven), a second level (represented by indicia 415 as being suitable for ages eight through ten) and a third level (represented by indicia 420 as being suitable for ages 11-14). The number of skill levels available for play as well as the age group or school level associated with each skill levels is discretionary and may be adjusted as desired or as suitably appropriate.

The player selects 320 the skill level desired to play. In the preferred embodiment, if the player selects indicia 410, representing the first or beginning level of play (decision 322), the player is then presented 324 with the beginning sequences and animations of that corresponding skill level (e.g., action 220, FIG. 2). In a preferred embodiment, the beginning level of play is a game directed toward younger children that may not be familiar with general financial concepts. This game is referred to herein as Carrots and Bunnies and is described in further detail hereafter.

If the player selects indicia 415, representing the intermediate level of play (decision 326), the player is then presented 328 with the beginning sequences and animations of the game corresponding to an intermediate skill level. In the preferred embodiment, the intermediate level of play is referred to as CASHFLOW FOR KIDS for ages eight through ten.

However, if the player selects indicia 420, representing the highest level of play, the player is then presented 329 with the beginning sequences and animations of the game corresponding to that skill level. In the preferred embodiment, the highest level of play is referred to as CASHFLOW FOR KIDS for ages eleven through fourteen.

Each educational interactive game preferably begins with a tutorial 220 (FIG. 2) that explains the displayed indicia (and their respective purposes), definitions, rules, and/or objectives of the game. This tutorial may be provided using audio and/or visual information from one or more animated characters and examples of sequences occurring during actual game play. The tutorial facilitates a player's rapid understanding of rules, objects and indicia of actual game play.

Carrots and Bunnies

Referring now to FIGS. 5 and 6A-6F, a method of play 500 and corresponding game indicia 600 for a beginner's level interactive financial education game will now be described. The beginner's level is preferably configured to convey financial principles without the use of money and finance lexicon or symbols, but rather financial principles are conveyed using symbols and objects that are more familiar and likeable to a younger age group. These familiar and likable objects and symbols however are presented to a young player in a manner in which a game player may associate principles that are analogous to actual financial principles as will be better understood from the following description of one example embodiment.

In this embodiment, an animated game narrator character named Toki has a farm for kids to take care of bunnies. The bunnies however, need carrots to stay in a player's bunny pen. Toki provides the player a certain number of carrots each harvest day to take care of the bunnies. However, the player can use the carrots for buying things such as seeds to grow their own carrots. The player may also invite more bunnies to come to the pen. The player must have enough carrots to feed all the bunnies in the bunny pen or the bunnies will leave. The object of this beginner's interactive financial education game is to grow enough carrots to keep the bunnies in the bunny pen.

When a player's turn begins 502, the player initiates 504 a random movement generator, for example by positioning cursor 10 over the associated indicia and clicking with a mouse or pressing enter (see for example FIG. 6A) or some other mechanism for conveying the players's desire to initiate action. The random movement generator identifies a game event to be encountered by the player character. In preferred embodiments, four game events are possible, a harvest 622 (FIG. 6B), a seed trade 623, a sunshine event 624 and/or a bunny visit 625.

In this embodiment, one game event is when Toki periodically gives the players a certain number of carrots each time a certain space is landed on or passed. Toki provides four carrots each time the player passes or lands on a blue harvest space ("harvest"). The harvest represents payday and the carrots given by Toki represent a player's salary.

Another game event is an optional trade for carrot seeds. Each time the player lands on a carrot seed space, the player is offered the opportunity to trade carrots (from the player's carrots on hand) for carrot seeds to plant in the player's garden. The cost of the carrot seeds may vary during game play and by the specific directions of the game event encountered. Each seed packet will grow a carrot in the player's garden during each harvest.

Another game event is referred to as a "bunny visit." Each time a player lands on a bunny visit space, the player has the choice of inviting a specified number of bunnies to stay or give the bunnies a specified number of carrots to come back later. Every bunny in a player's garden eats one carrot during every harvest. If there are not enough carrots on hand to feed every bunny in the pen, the bunnies without carrots will leave. Randomly, throughout the game, a skunk may enter the game and play cannot continue until the skunk is dispensed with. The skunk represents unexpected expenses and can be lured off the player's screen, for example into a hole or through a gate, by dangling a carrot in front of the skunk in the direction desired to lure the skunk.

Yet another game event is a sunshine event. Each time a player lands on, and in certain embodiments passes by, a sunshine space, the player is offered a bonus. The bonus may include awarding a specified number of carrots to add to the player's existing carrots on hand or awarding one or more carrot seed packets to the player for growing carrots in the player's garden. The bonus associated with a sunshine card may also include the opportunity to pay a specified amount of carrots to send bunnies already in the player's bunny pen away.

Figure 6A:
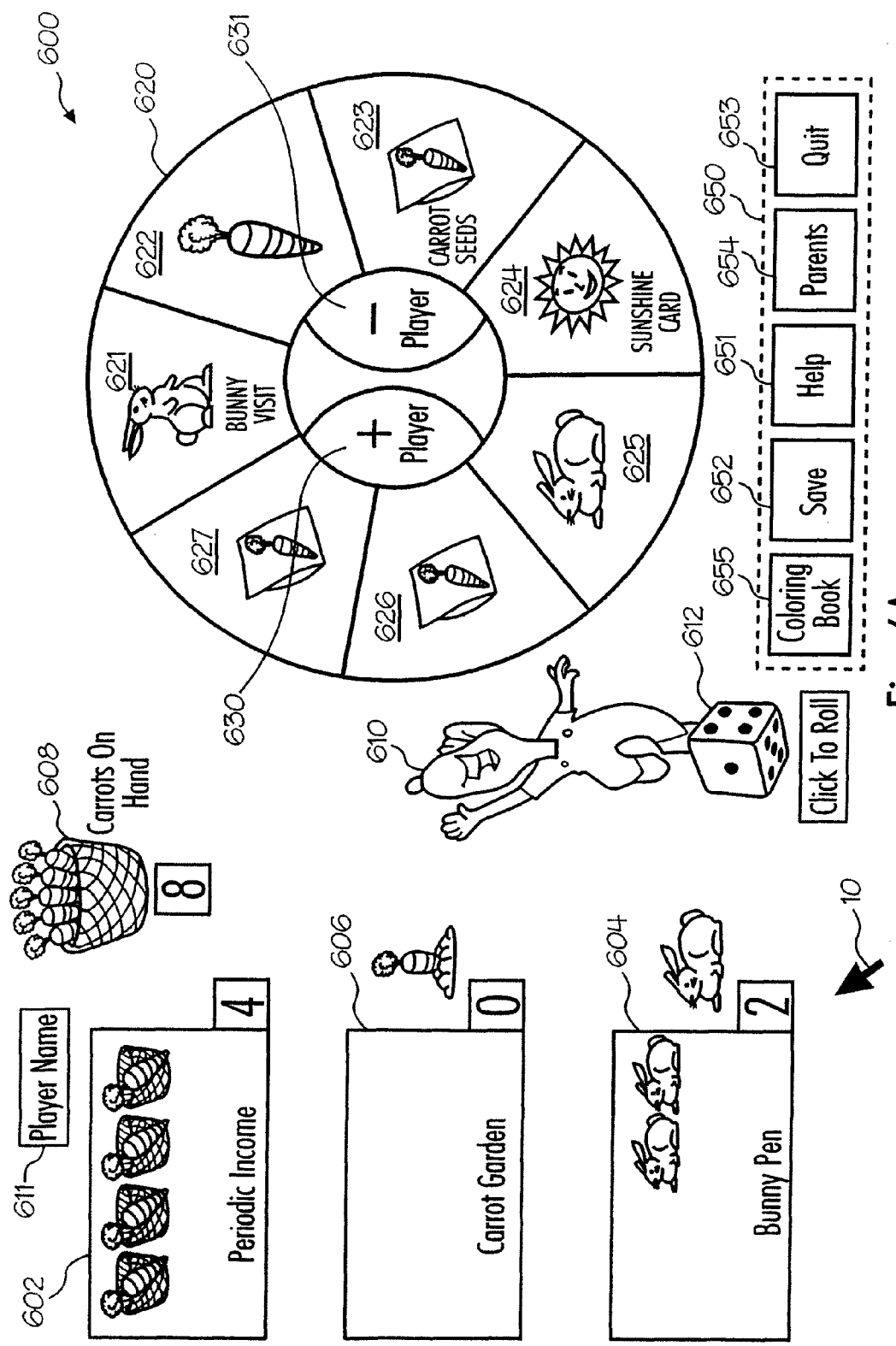
FIGS. 6A-6F illustrate indicia and sequences of playing a game according to a first embodiment of the invention.
Figure 6B:
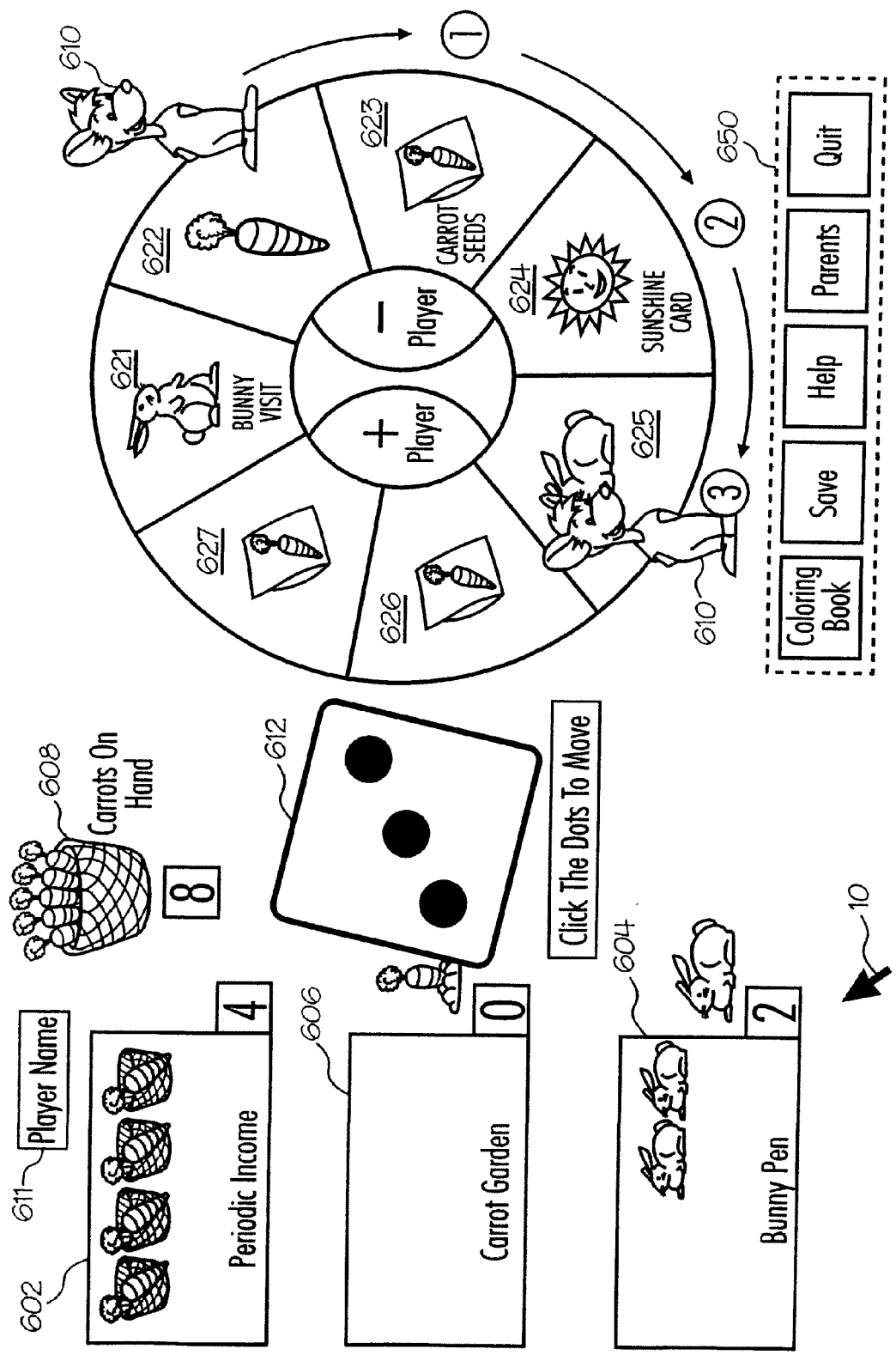
Figure 6C:
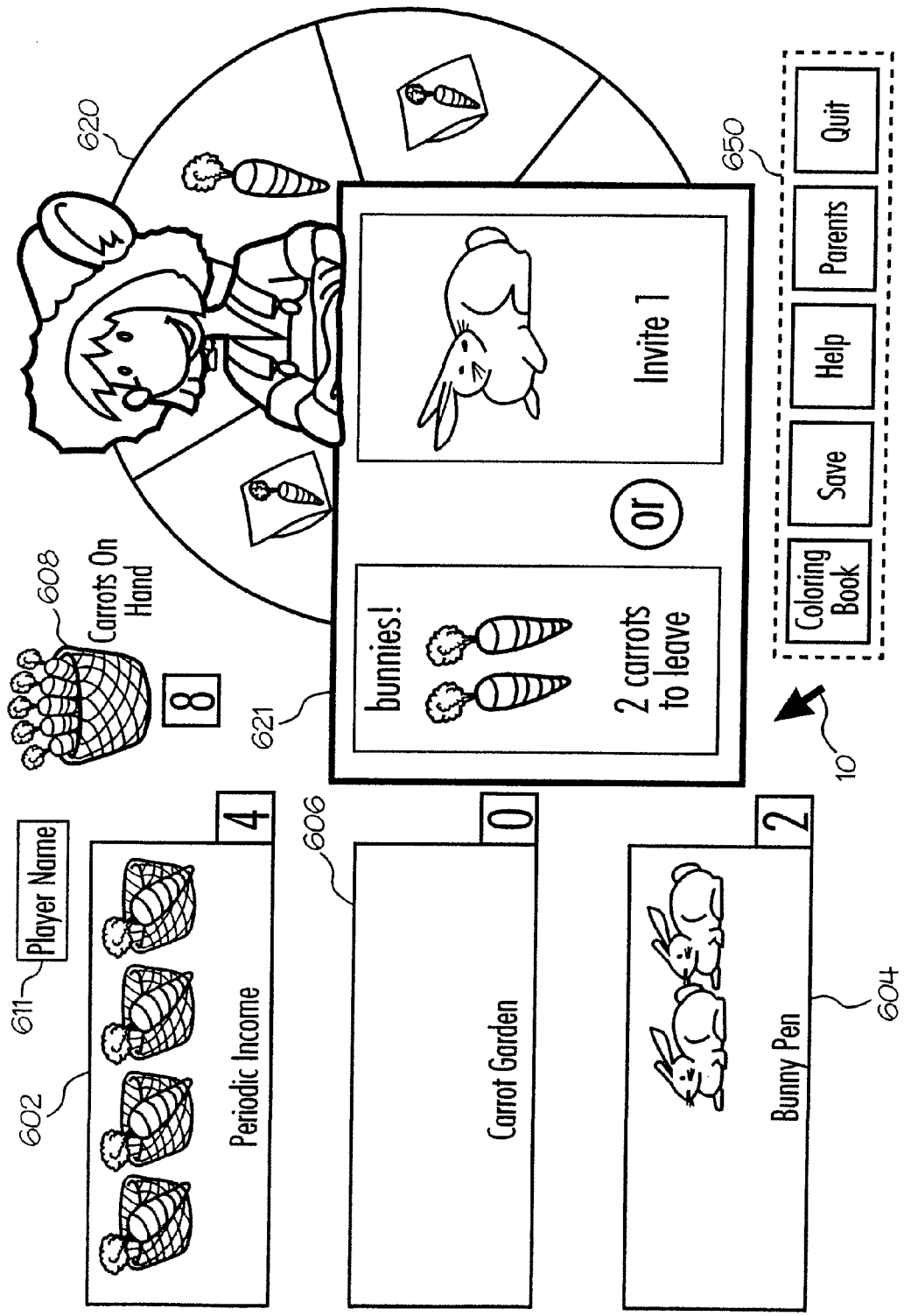
Figure 6D:
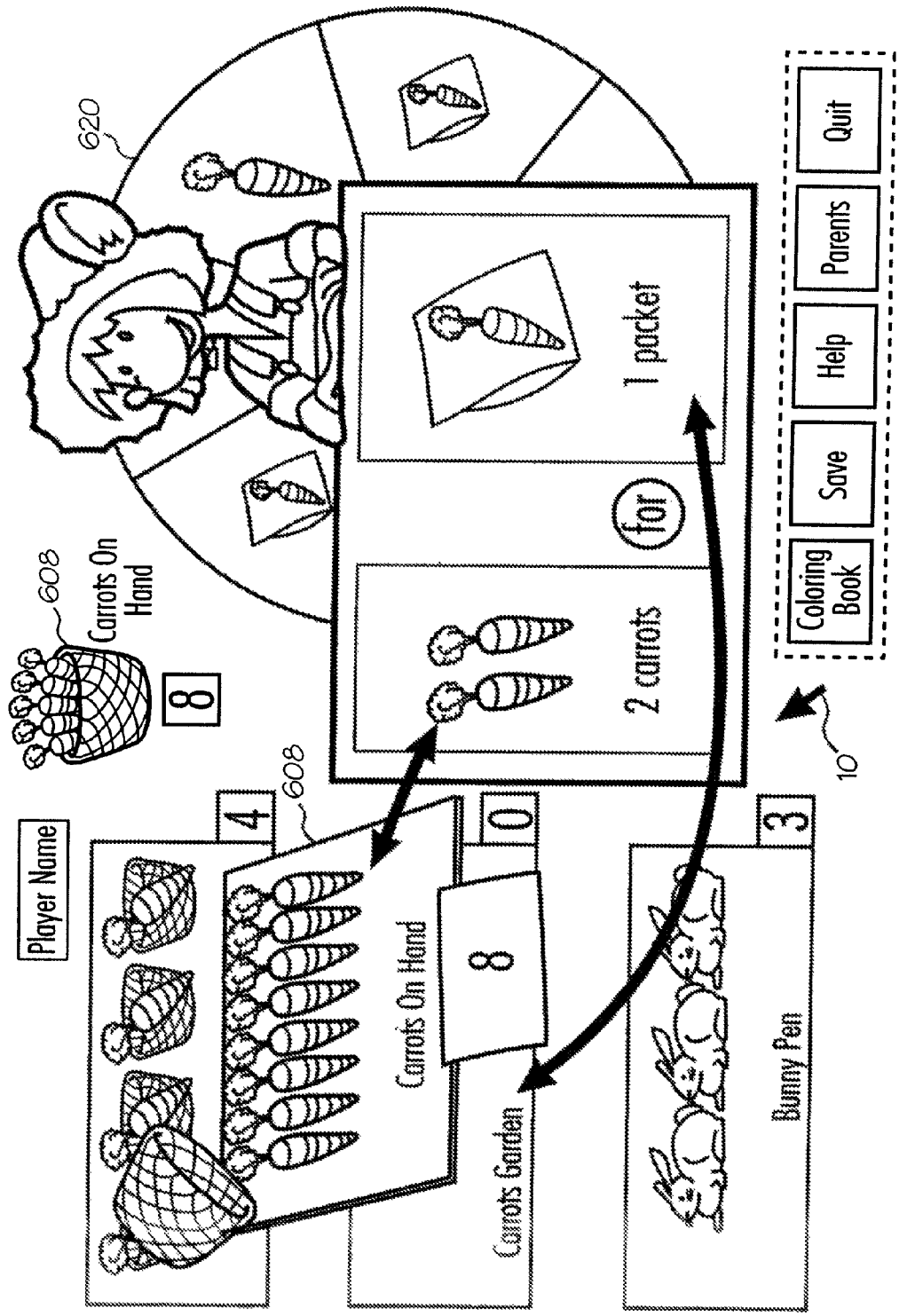
Figure 6E:
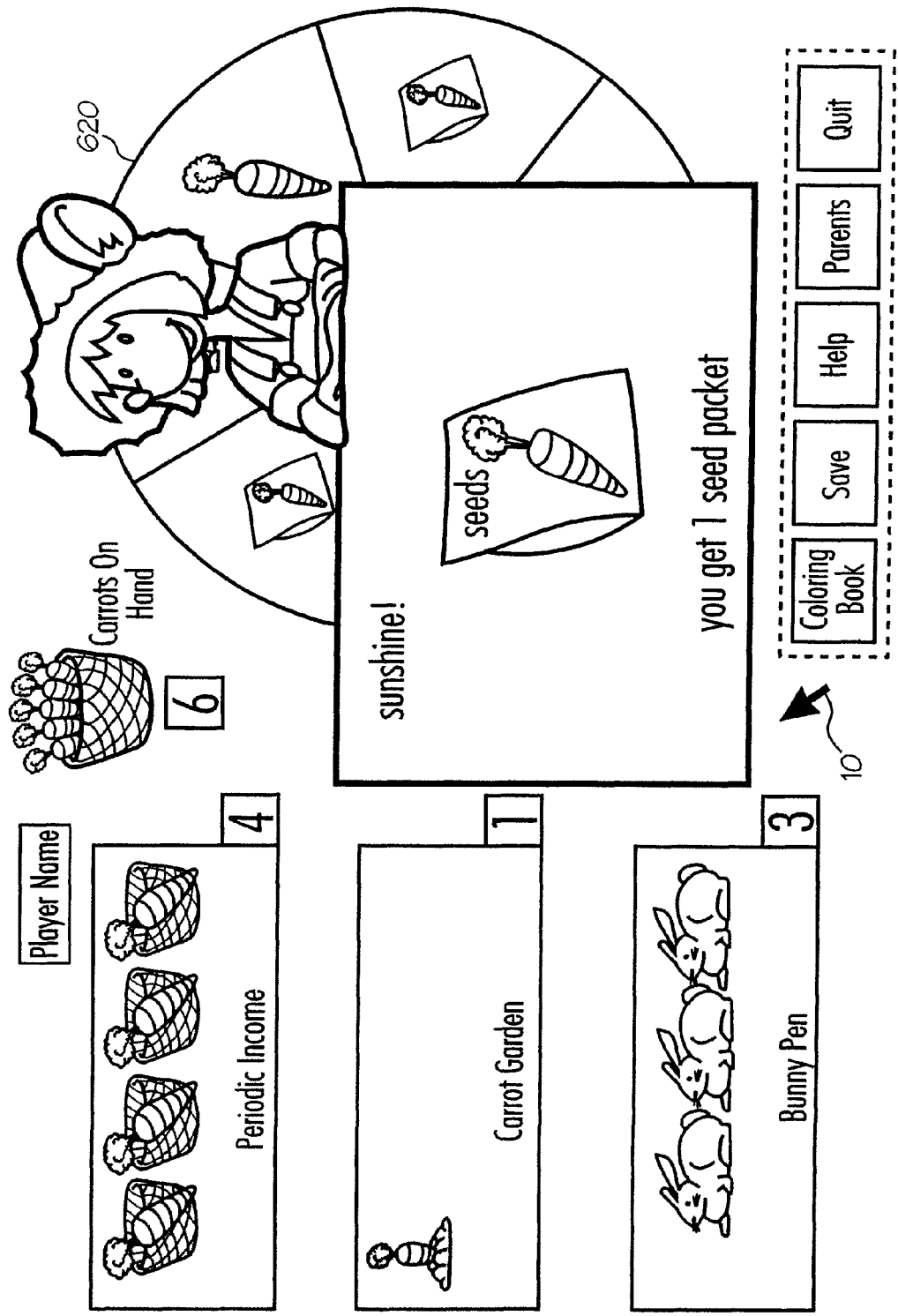

In a preferred embodiment and from a player perspective, Carrots and Bunnies includes a plurality of electronically displayed indicia 600 (FIGS. 6A-6F) for representing: periodic income 602 (e.g., harvest carrots); expenses 604 (e.g., bunnies that consume carrots); income assets 606 (e.g., carrot seeds planted in a garden); an amount existing liquid capital 608 (e.g., carrots on hand); random player movement generator 612, game event sequencer 620 and corresponding game event identifier cards (FIGS. 6C-6E). Optionally, Carrots and Bunnies further includes one or more animated character images 610 representing a game character played by a player, corresponding character name 611 and game menu 650. Also, optional but preferable, are selectable add and remove player indicia 630, 631.

Indicia representing periodic income 602, expenses 604, income assets 606 and liquid capital (referred to herein as "carrots on hand" or in later embodiments, "cash on hand") 608 serve the purpose of indicating a player's financial status, and changes thereto. Preferably indicia 602, 604, 606 and 608 reflect respective age appropriate symbols that are analogous to financial aspect associated with each symbol, for example, carrots in baskets, planted carrots and/or bunnies. These symbols preferably are accompanied by a numeric value that corresponds to the status of the financial aspect, for example, the numeral eight adjacent the bucket of carrots represents that the player has eight carrots on hand. In a preferred embodiment, a player may start a game with eight carrots on hand 608, four salary harvest carrots 602, two bunnies 604, and no carrots planted in the garden 606, however, the starting values and symbols used are discretionary and may be changed as desired.

Indicia for random player movement generator 612 may be any suitable image or images to reflect randomly distanced movements for a player's character to navigate game event sequencer 620; examples of which include numbered or color-coded spinners or die. Indicia for random player movement generator 612 may be omitted and in its stead, the player character moves about game event sequencer 620 randomly, i.e., without showing any movement generating indicia. Alternatively, game sequencer 620 may rotate to identify random game events encountered by a player. In a modified embodiment, the player may be presented with a question about game play or financial principles, for which a correct answer will allow the player to move a predetermined distance and/or a wrong answer another predetermined distance.

Game event sequencer 620 functions to identify the random game events that are encountered by a player based on the player character's movement determined by random movement reflected by indicia 612. For example, if indicia 612 reflect a number, the player's character will encounter the game event (e.g., events 621-627) corresponding to the space on which the character lands after moving that number of spaces. Alternatively, if indicia 612 are color-coded, the player's character may encounter the game event determined by the next space on game event sequencer 620 that corresponds to the color reflected by indicia 612. In one preferred embodiment, indicia 612 is a die animated to roll and display a number when a player initiates the roll (e.g., by clicking on suitable indicia with a mouse). The player may click on each dot representing the number shown on the rolled die to move the player's character by increments of one and audible and/or visual indicators count the player's movement. This embodiment may facilitate improved counting skills for young players.

Optional indicia for animated character image 610 and corresponding character name 611 function to identify a particular player's turn as well as potentially providing entertainment to the player. For example, character image 610 may be animated dancing, talking and moving about event sequencer 620.

Indicia 650 for game menu functions are also optional and serve to provide a player with game control options and additional features. In preferred embodiments, indicia 650 may include menu buttons 651, 652 and 653 for respective, player help, saving and/or quitting game options. Additional menu buttons 654, 655 may be made available for parental information (e.g., lesson content and/or updating) and/or coloring book printouts options, among others.

Selectable add player indicia 630 and subtract player indicia 631 are optionally included amongst game indicia 600 to enable players to begin or leave during a game without affecting other players' games. In one preferred embodiment, up to five players may be added by selecting add player indicia 630. Upon selection of add player indicia 630, each new player is able to select a predefined game character (e.g., one of variously colored boy or girl mice) and input a name for the character (e.g., 230, 240; FIG. 2). Normal game play (action 250; FIG. 2) resumes after any new player has been added.

In a similar manner, when remove player indicia 631 are selected, indicia for identifying which player to remove (not shown) are presented on the screen. In a preferred embodiment, cursor 10 changes from its normal shape (e.g., arrow) into a remove player/character pointer indicia which may then be moved over the player character that is desired to be removed and selected, for example by clicking a mouse button. Selectable confirm player removal indicia (not shown) may then optionally appear on the screen to confirm that the selected player/character should be removed from game play. After confirming removal of the player/character, game play resumes.

If the player's character passes or lands 508 on a harvest space (e.g., 622; FIG. 6B), the player receives 512 an amount of carrots identified by indicia 602 into the player's carrots on hand 608. The player further receives 516 a carrot for each seed planted in garden 606 and a carrot is subtracted 520 (from carrots on hand 608) for each bunny present in pen 604. If it is determined 524 that there are enough carrots are on hand to feed all the bunnies, play continues. However, if the player does not have enough carrots on hand to feed all the bunnies, the game is over and may be restarted 528 from the beginning. In an alternate embodiment, the number of bunnies without carrots will leave the player's bunny pen. In this alternate embodiment, the player must accumulate a certain amount of bunnies in the bunny pen (e.g., by encountering bunny visit game events) in order to be eligible to win.

If the player's character lands 532 on a bunny visit space (e.g., 621, 625; FIG. 6B), the player is given the choice 536 whether to invite a stated number of bunnies to the player's bunny pen or give the bunnies a stated number of carrots (from carrots on hand 608) to go away and come back later (see, e.g., FIG. 6C). If the player invites 536 the bunnies to visit his/her bunny pen, it is determined 540 whether the player has enough carrots on hand to feed all the bunnies, including the newly invited bunnies. If not, the game ends and is restarted 528 as discussed above. Alternatively, if the player does have enough carrots on hand, the bunnies are added to the pen 542 and the player's turn ends while play passes 544 to the next player if any. The determination of whether the player possesses enough carrots on hand to feed the bunnies may be made after passing or landing on a harvest space. If however, the player chooses not to invite the bunnies, the number of carrots specified is deducted 548 from the player's carrots on hand and play passes to the next player if any 544.

When the player's character lands 552 on a carrot seed space, the player is offered the opportunity to trade a specified number of carrots for a specified number of carrot seeds to plant in the player's garden (see, e.g., FIG. 6D). If the player decides to make the trade 556, the specified number of carrot seeds are added 560 to the player's garden and the number of carrots required for the trade are deducted from the player's carrots on hand (see FIG. 6E).

When the player's character lands 568 on a sunshine space (e.g., 624; FIG. 6B), the player is offered an added bonus such as those previously specified. The bonus event is performed, for example adding carrots to carrots on hand, and the player's turn ends followed by the next player's turn 544, or if there are no other players, the current player's next turn 502. In certain other embodiments, if a player passes the sunshine space, the player is awarded the bonus and further encounters the game event of the space on which he/she landed.

Figure 5A:
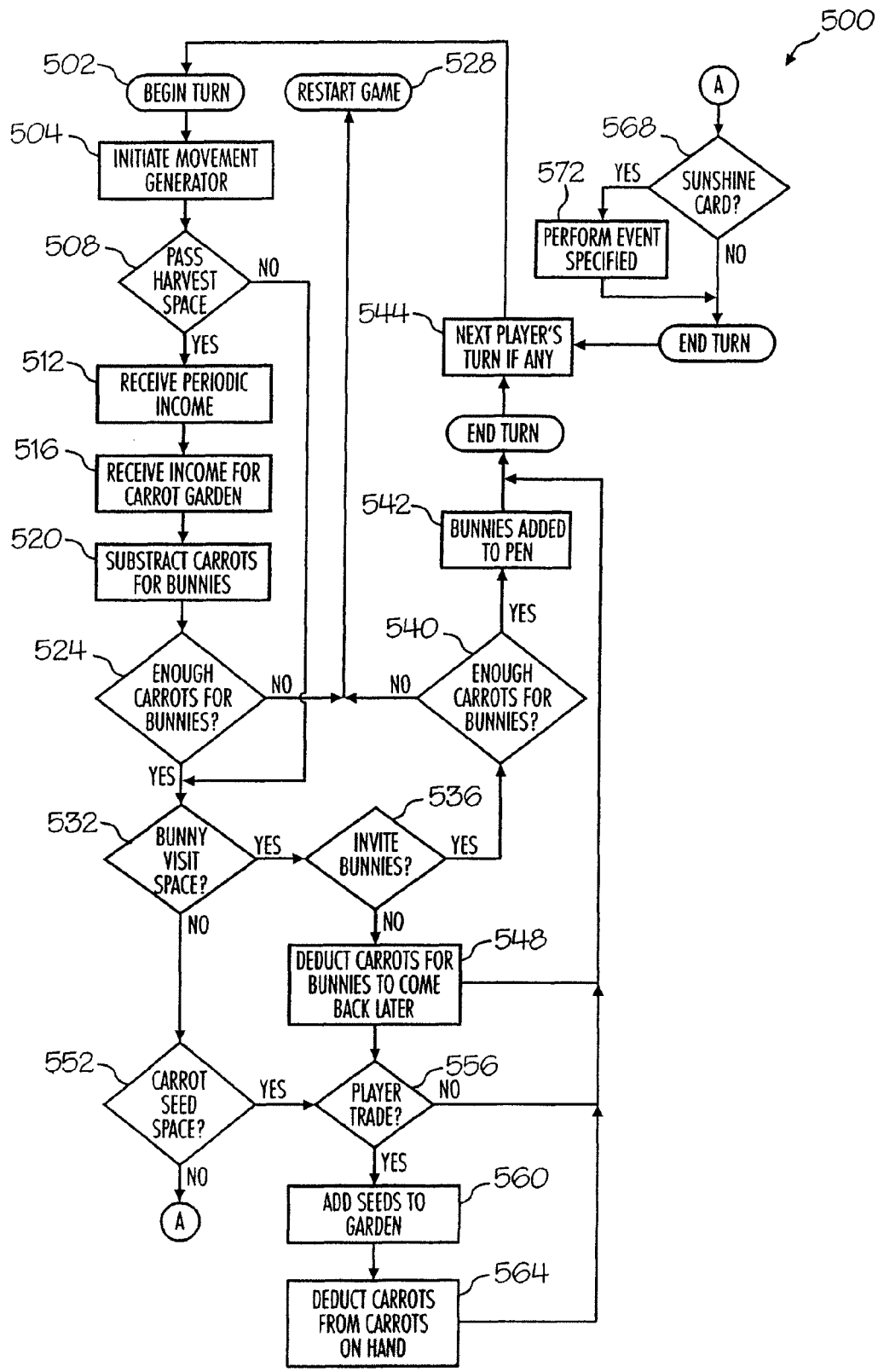
FIGS. 5A-5B illustrate flow diagrams for an educational interactive game according to a first embodiment.
Figure 5B:
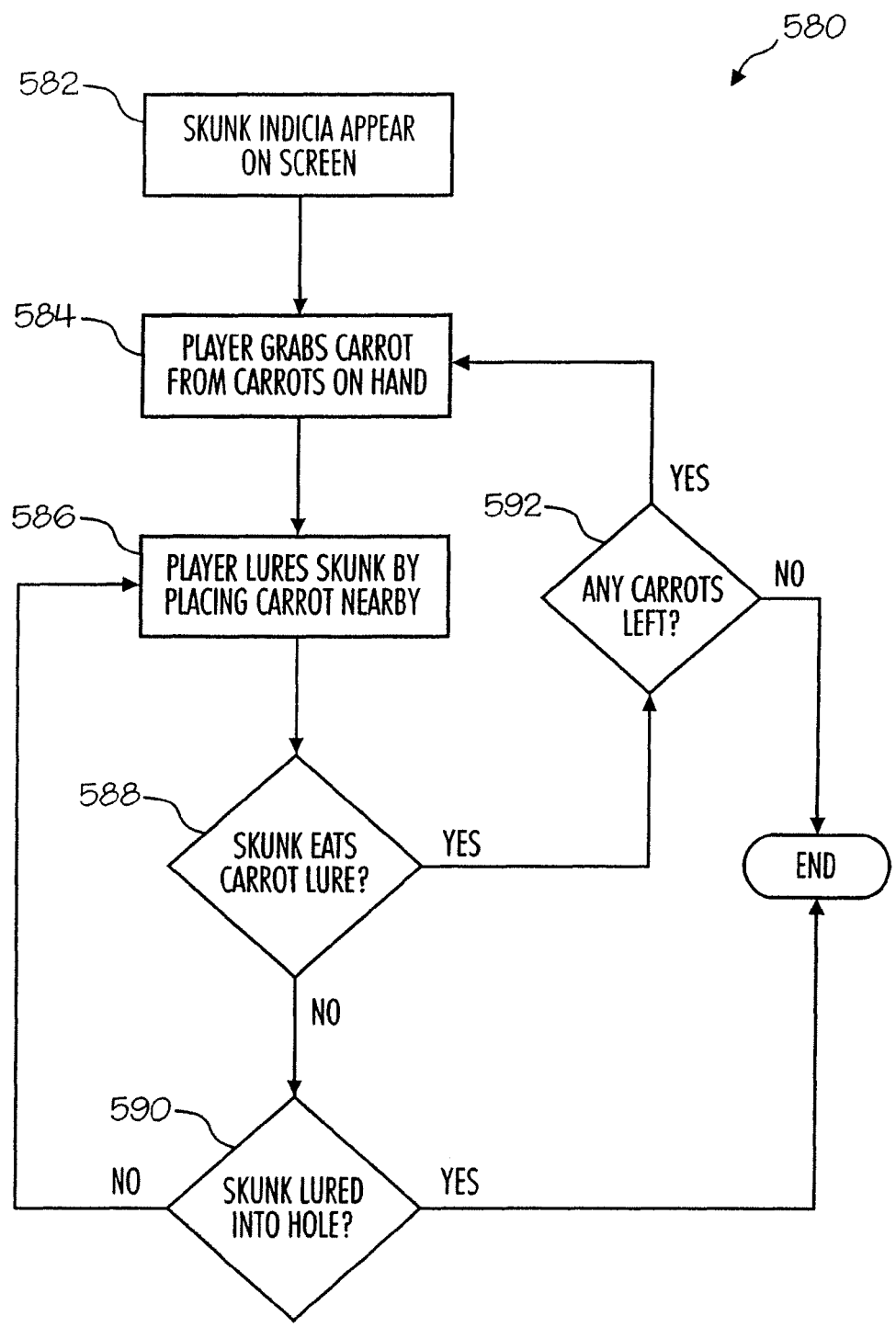
Figure 6F:
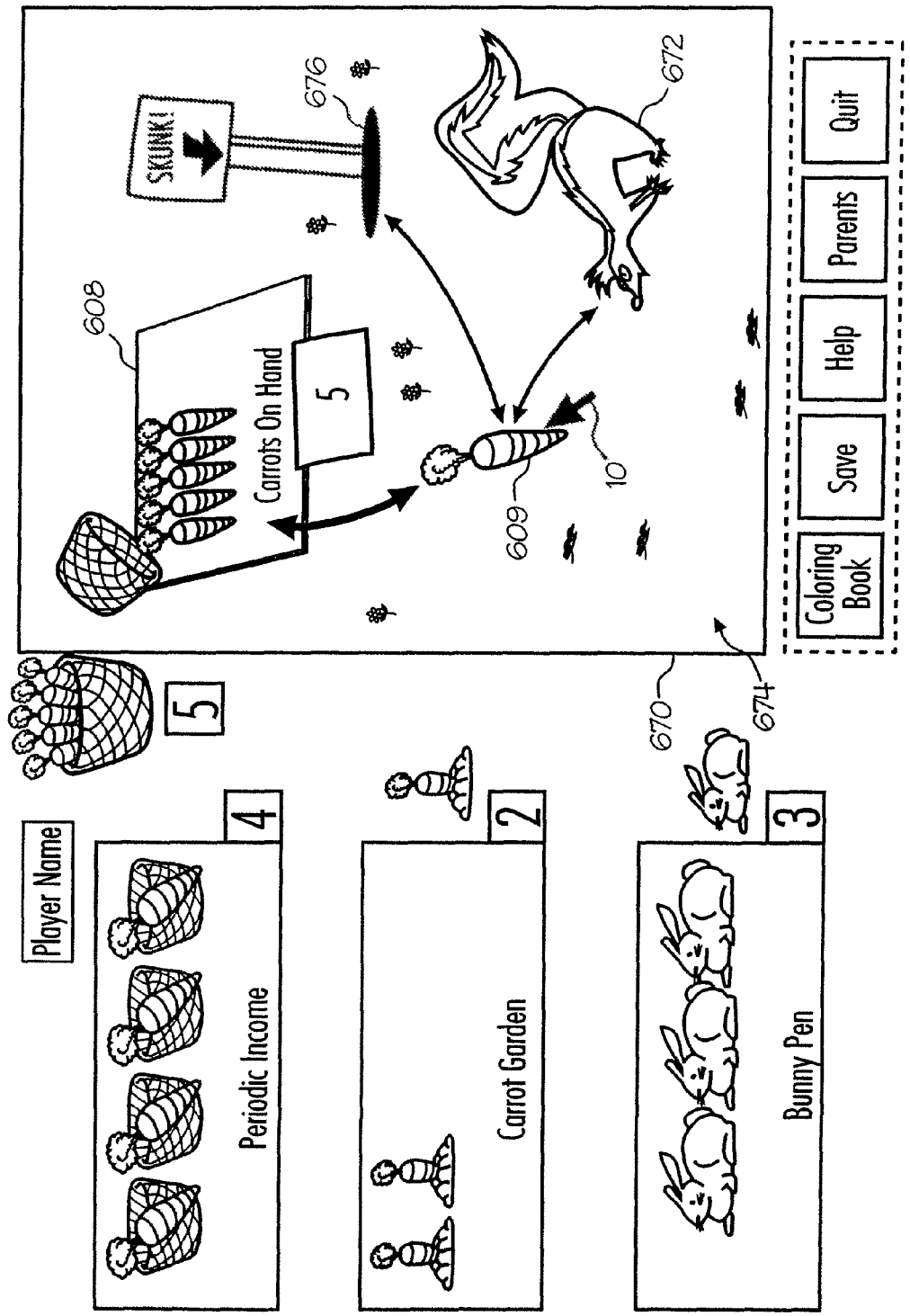

Referring to FIGS. 5B and 6F, an optional random event that may be included in the interactive financial education games of the present invention includes the occurrence of unexpected expenses during game play. In a preferred embodiment of Carrots and Bunnies, unexpected expenses take the form a skunk attack (method 580, FIG. 5B; indicia 670; FIG. 6F). At random times during the course of method 500 (FIG. 5A) of game play, skunk attack indicia 670 may appear (action 582) on the player's screen. Skunk attack indicia 670 preferably includes indicia representing an animated skunk 672, and indicia representing a skunk attack background portion 674 including indicia representing a skunk hole 676.

In a preferred embodiment, the player uses cursor 10 to selectably drag (action 584) a carrot (e.g., carrot 609; FIG. 6F) from the player's carrots on hand to skunk attack indicia 670. Using cursor 10, the player positions (action 586) carrot 609 near skunk 672 in a direction the player desires to lure skunk 672 (e.g., towards skunk hole 676). If carrot 609 is not placed close enough to skunk 672 it may be ignored. However, if carrot 609 is placed too close to skunk 672, the skunk will eat the carrot (decision 588). If the carrot is consumed, the player must use another carrot from the available carrots on hand to repeat the processes until skunk 672 is lured into skunk hole 676 (decision 590). If the player runs out of carrots on hand (decision 592), the player is no longer able to lure skunk 672 into hole 676 and must quit the current game.

The games, methods and systems of this embodiment of the invention are directed to familiarize young children, e.g., ages 5-8, with basic principles used in financial accounting and cash flow management.

Cashflow for Kids

The interactive educational game Cashflow for Kids for intermediate and upper skill level players conveys similar principles about financial education as Carrots and Bunnies, except that Cashflow for Kids ages 8-10 and ages 11-14 utilizes actual financial terms instead of symbolic analogies.

Turning to FIGS. 7A-7J, in a preferred embodiment, game 700 includes electronically displayed indicia representing: a financial statement 701; random movement selector 712; game event sequencer 720 and corresponding event identifying spaces and optionally, animated character image 710; corresponding character/player name 711 and game menu controls 750.

Financial statement indicia 701 may include any mechanism for providing suitable visual of an associated player's financial status. In a preferred embodiment, financial statement indicia 701 include a compilation of indicia representing, by way of example: periodic income 702; expenses 704; passive income from investments 706; an amount liquid capital 708 (i.e., cash on hand) and in the most preferred embodiments, indicia 709 representing current levels of assets and liabilities in the respective player's possession.

Indicia representing periodic income or salary 702, expenses 704, passive income 706 and cash on hand 608 serve the purpose of indicating a player's financial status, and changes thereto during game play. Preferably indicia 702, 704, 706 and 708 depict a player's status in regard to the respective economic aspect using shape-coded and/or color-coded spaces and tokens as well as a numeric value associated with each financial aspect. For example, earned income (e.g., salary) indicia 702 may comprise tokens and spaces therefor in the form of blue triangles, passive income indicia 706 in the form of green circles and corresponding tokens, and expenses indicia 704 in the form of red squares and corresponding tokens.

Indicia for random movement selector 712 may be any suitable image or images to reflect randomly generated movement distances for a player's character to navigate game event sequencer 720. Indicia 712 may be similar to those previously discussed in respect to the Carrots and Bunnies embodiments of the invention.

Game event sequencer 720 functions to identify random game events encountered by a player based on random movement selector indicia 712 and may comprise any suitable indicia to serve this function. For example, if indicia 712 reflect a number, the player's character will encounter the game event corresponding to the space on sequencer 720 that the player's character lands after moving from a beginning point, the number of spaces identified by indicia 712. Alternatively, if indicia 712 are color-coded, the player's character may encounter the game event determined by the next space on game event sequencer 720 that corresponds to the color reflected by indicia 712. Optional indicia for animated character image 710 and corresponding character name 711 function to identify a particular player's turn as well as potentially providing entertainment to the player, e.g., character image 710 may be animated during game play to dance, talk and move about event sequencer 720.

Game event sequencer 720 may include a plurality of spaces, e.g., spaces 721-724, corresponding to various game event categories. In a preferred embodiment, event categories include Investments, Expenses, Sunshine events, and Paydays. In one preferred embodiment, sequencer 720 includes two blue payday spaces 721, fourteen green Investment spaces 722, six red Expenses spaces 723 and one yellow Sunshine card space 724, although the number of each type of space and respective colors can vary. However, as specified above, each event category corresponds to its respective subject matter by color; e.g., green representing revenue or money opportunities, red representing debt, or yellow represent sunshine.

Indicia 750 for game menu functions are optional (e.g., game menu functions would not be present in traditional board game implementations) and serve to provide a player with game control options and additional features. In preferred embodiments, game control indicia 750 may include menu buttons 751-753 for respectively, player help, and saving/quitting games. Additional menu buttons 754, 755 may be made available for parental information, e.g., lesson content, updating game versions via a website, and/or various printing options, among others.

At the beginning of play, each player is provided with an amount of the following: earned income 702 (e.g., $1000.00); expenses 704 (e.g., $700.00); and cash on hand 708 (e.g., $3000.00), but any amounts may be used and different players could have different amounts.

Figure 7A:
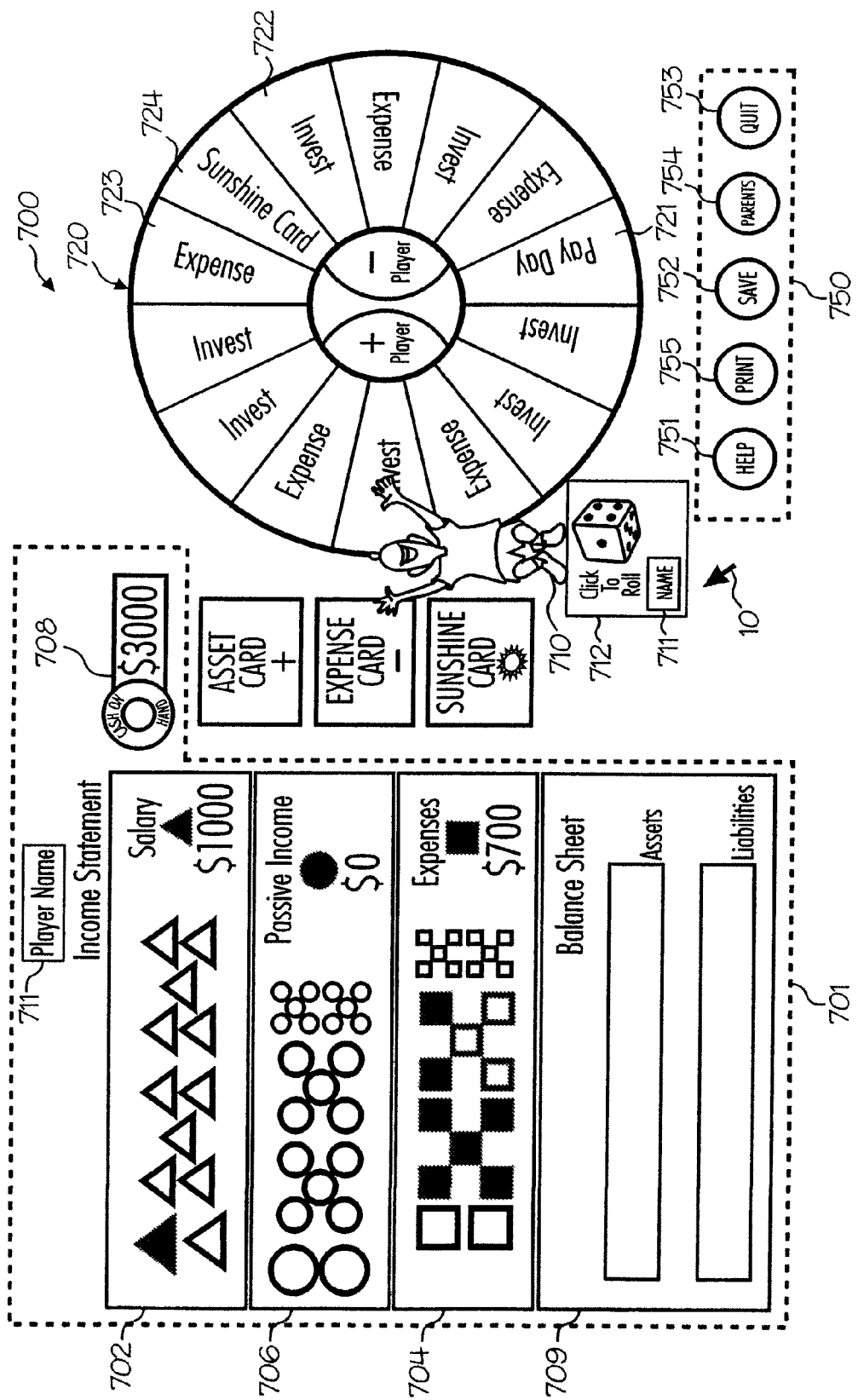
FIGS. 7A-7J illustrate sequences, player actions and game indicia of an educational interactive game according to various other embodiments of the invention.
Figure 7B:
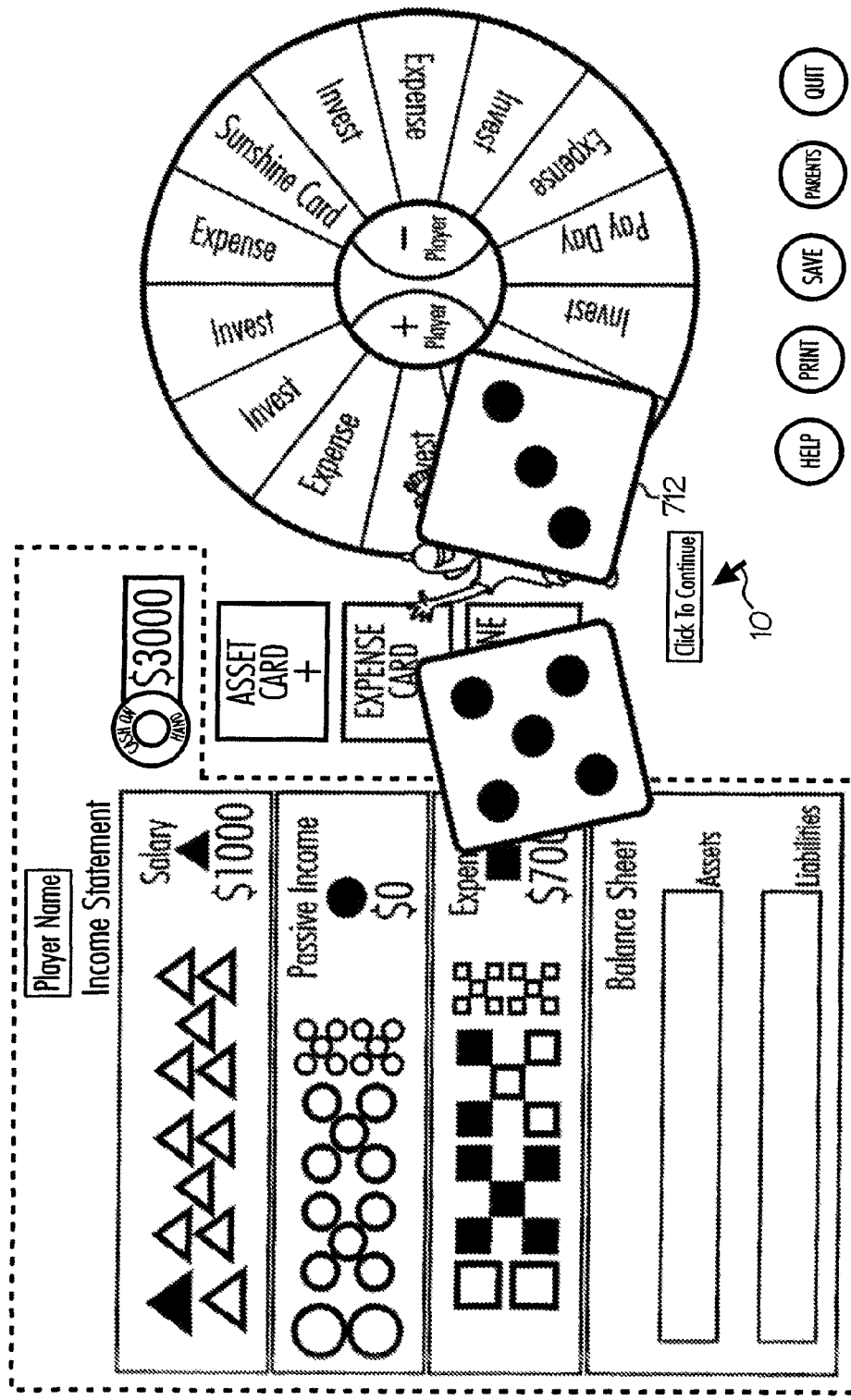
Figure 7C:
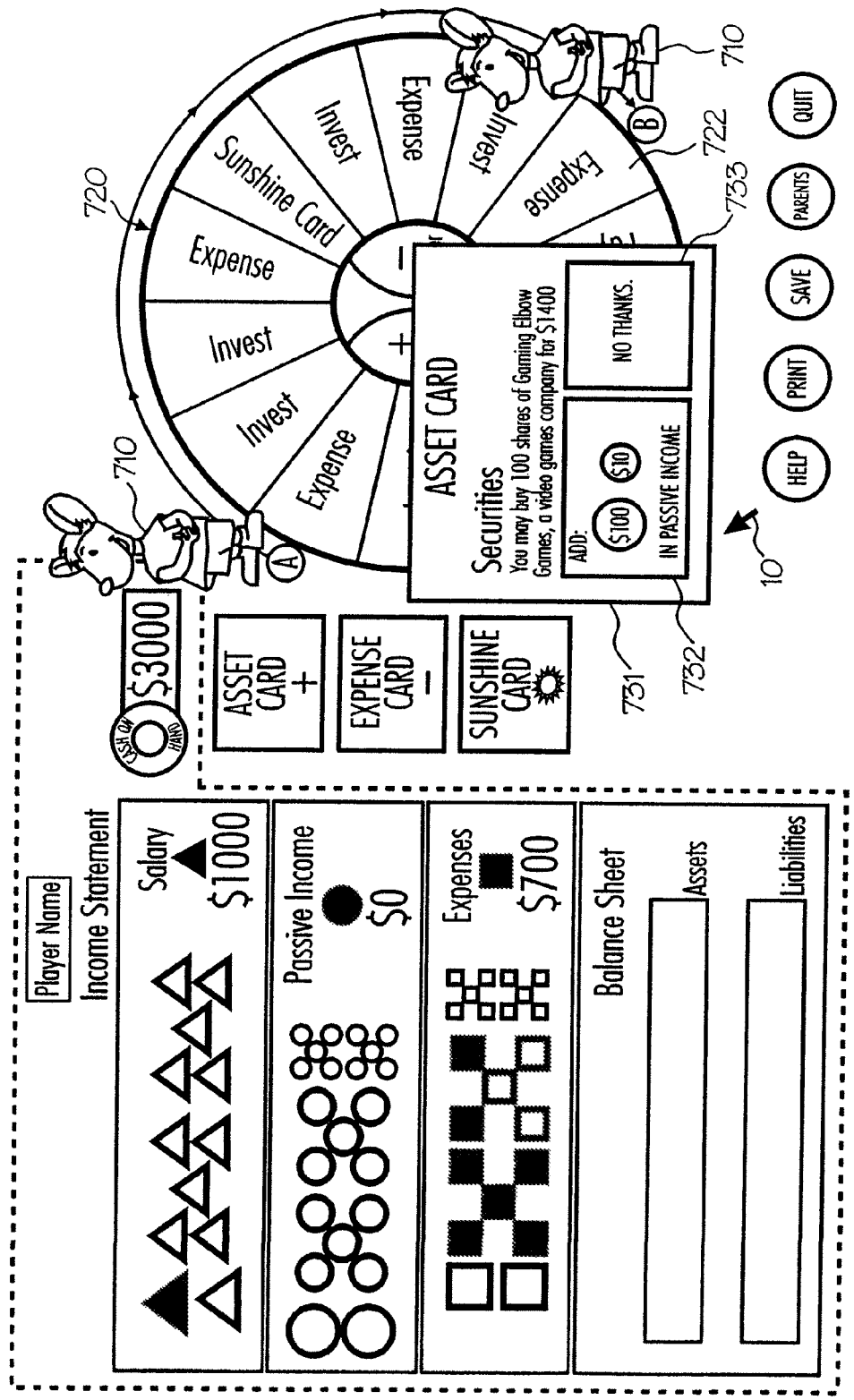
Figure 7D:
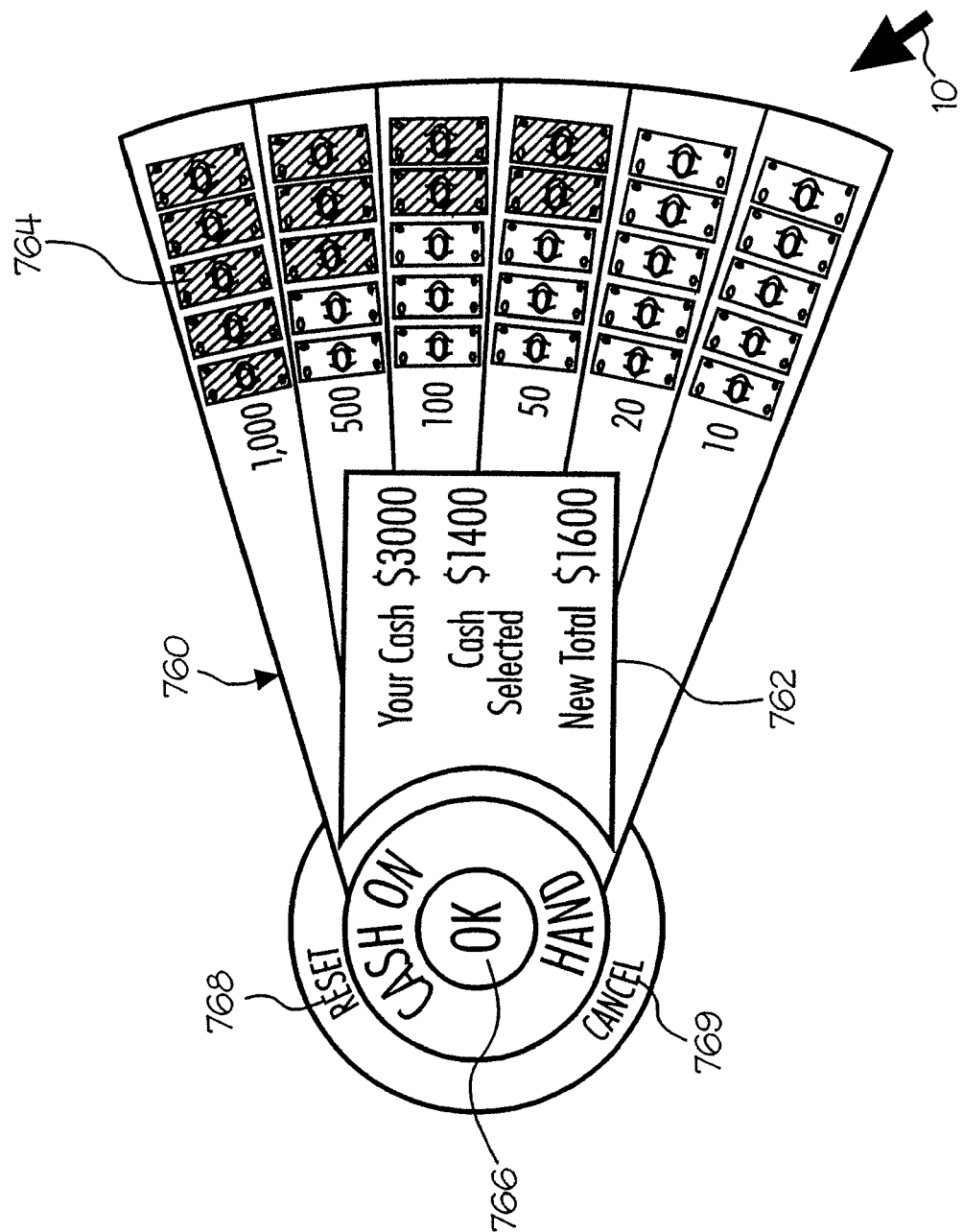

A player's turn begins by initiating random movement selector 712, for example, by moving cursor 10 over indicia 712 and clicking with a mouse (e.g., 120; FIG. 1) or pressing enter on a keyboard (e.g., 125; FIG. 1) or selecting indicia 712 with some other input device. The game responds to the players input by generating a random movement identifier, using basic random generating algorithms, and displays the random movement identifier as indicia 712, e.g., roll of eight on dice (FIG. 7B).

In one embodiment, the player's character 710 is animated to move to the position on sequencer 720 that corresponds to the random movement indicia 712; for example, eight spaces from position A to position B. At position B, character 710 lands on a green Investment space 722 and encounters a game event specified on subsequently displayed Asset Card indicia 731. In an example embodiment depicted in FIG. 7C, the game event specified by Asset Card indicia 731 offers the player an opportunity to buy an income asset, e.g., securities.

In preferred embodiments, Asset Card 731 includes a visual and/or audible description of an arbitrary income asset, the price it will cost the player to purchase, and the amount of passive income that will be derived from purchase of the income asset.

The player may decide not to buy the available income asset by selecting the appropriate indicia, e.g., selectable indicia 733 indicating "no thanks" or other similar indicia for the player to decline the offer. Alternatively, the player may decide to buy the offered securities by selecting offer acceptance indicia 732, which indicates the player's willingness to buy the available income asset.

If the player selects offer acceptance indicia 732, the player pays for the asset using available cash on hand 708. In a preferred embodiment user selectable payment indicia 760 (FIG. 7D) appears on the player's screen to accomplish this end. User selectable payment indicia 760 serves to allow the player to select various denominations of money for paying owed amounts, e.g., newly encountered income assets and/or expenses. Indicia 760 further serve the purpose of reinforcing and/or educating the player about mathematics involved with various monetary denominations including counting and making change.

User selectable payment indicia 760 may be any suitable image or combination of images and corresponding user interface code to serve these purposes. In one embodiment, indicia 760 comprises a combination of informational and user selectable indicia including balance sheet indicia 762, denomination indicia 764, remaining payment indicia 766, reset indicia 768 and cancel transaction indicia 769.

Balance sheet indicia 762 preferably reflects to the player, the amount of cash on hand available before the payment transaction, the amount of cash currently selected for payment, and the amount of cash on hand remaining after the cash selected for payment is deducted from starting value of cash on hand. Indicia 762 may be any visual image or combination of images to serve these purposes including numerical expressions and/or graph expressions.

Denomination indicia 764 are presented for a user to select denominations of available cash on hand for paying expenses. Denomination indicia 764 may be any suitable visual representation and corresponding user interface code suitable for this purpose. In a preferred embodiment, denomination indicia 764 include representations of a plurality of monetary denominations including tens, twenties, fifties, hundreds, five hundreds and thousand dollar bill denominations. Indicia 764 preferably comprise a plurality of bill faces, e.g., five, for each denomination. The bill faces are highlighted depending on the number and type of bill denominations available to the player. A user may select a highlighted bill, e.g., using cursor 10, to add the amount of bill face value to the total of cash selected and subtract from the amount of cash on hand remaining (represented by indicia 762).

Once a highlighted bill is selected, that bill is de-highlighted. When only one bill of a particular denomination remain highlighted, and if that bill is selected, user selectable payment indicia 760 will make change from one or more higher denomination bills, if available, thereby de-highlighting the higher denomination bill(s) used to make change, and highlighting at least one bill of the denomination desired. User selectable payment indicia 760 is preferably configured to maintain at least one highlighted bill for each denomination available based on the player's cash on hand. For example, if a player only has two hundred dollars cash on hand, the thousand denomination and five hundred denomination would not have any highlighted bills while the one hundred, fifty, twenty and ten denominations would preferably each have at least one highlighted bill.

In one version of the code supporting the functionality of user selectable payment indicia 760, a de-highlighted bill may be selected by the user to remove that amount from the cash previously selected by the player (reflected by indicia 762). For example, if the player has a payment balance of $80 and selected a $100 denomination bill for payment, the player would have a balance of plus $20. The player could then select a de-highlighted bill from the $20 denomination indicia which would then subtract a value of $20 from the cash selected (originally $100, now $80) and the selected de-highlighted twenty would become highlighted.

Remaining payment indicia 766 reflects the amount of money left to pay for the purchase. In preferred embodiments, a user is forced to manipulate the denomination indicia 764 individually to select the exact value represented by remaining payment indicia 766. Once the item has been paid for with the appropriated amount of money, a user selectable "OK" may appear in the remaining payment indicia 766. When the player selects the "OK" represented by indicia 766, e.g. using cursor 10, user selectable payment indicia 760 are removed from the screen and the user continues with his/her turn.

Reset indicia 768 are provided for a player to selectably reset indicia 760 to its original display of bill denomination indicia 764, remaining payment indicia 766 and balance sheet indicia 762, i.e., before the user selected any denominations of cash to apply towards the purchase price. Indicia 768 may be any image or combination of images and corresponding user interface code to accomplish this purpose.

Cancel transaction indicia 769 are provided for a user to selectably cancel the current payment transaction and return the player back to the previous screen, e.g., view the game event card 731. Indicia 768 may be any suitable image or images and corresponding user interface code suitable for this purpose.

The money-changing/selecting features of the present invention utilize machine readable code executed by a computer processor (e.g., processor 115; FIG. 1) to perform the foregoing functions. The program for supporting the money-changing functionality may have a wide range of purposes outside that of educational interactive games, such as currency exchange and/or other financial applications. Notwithstanding, for the educational interactive games of the present invention, money changer/selector indicia and corresponding computer coded functionality assists children in developing/reinforcing mathematics and accounting skills during game play.

Figure 7E:
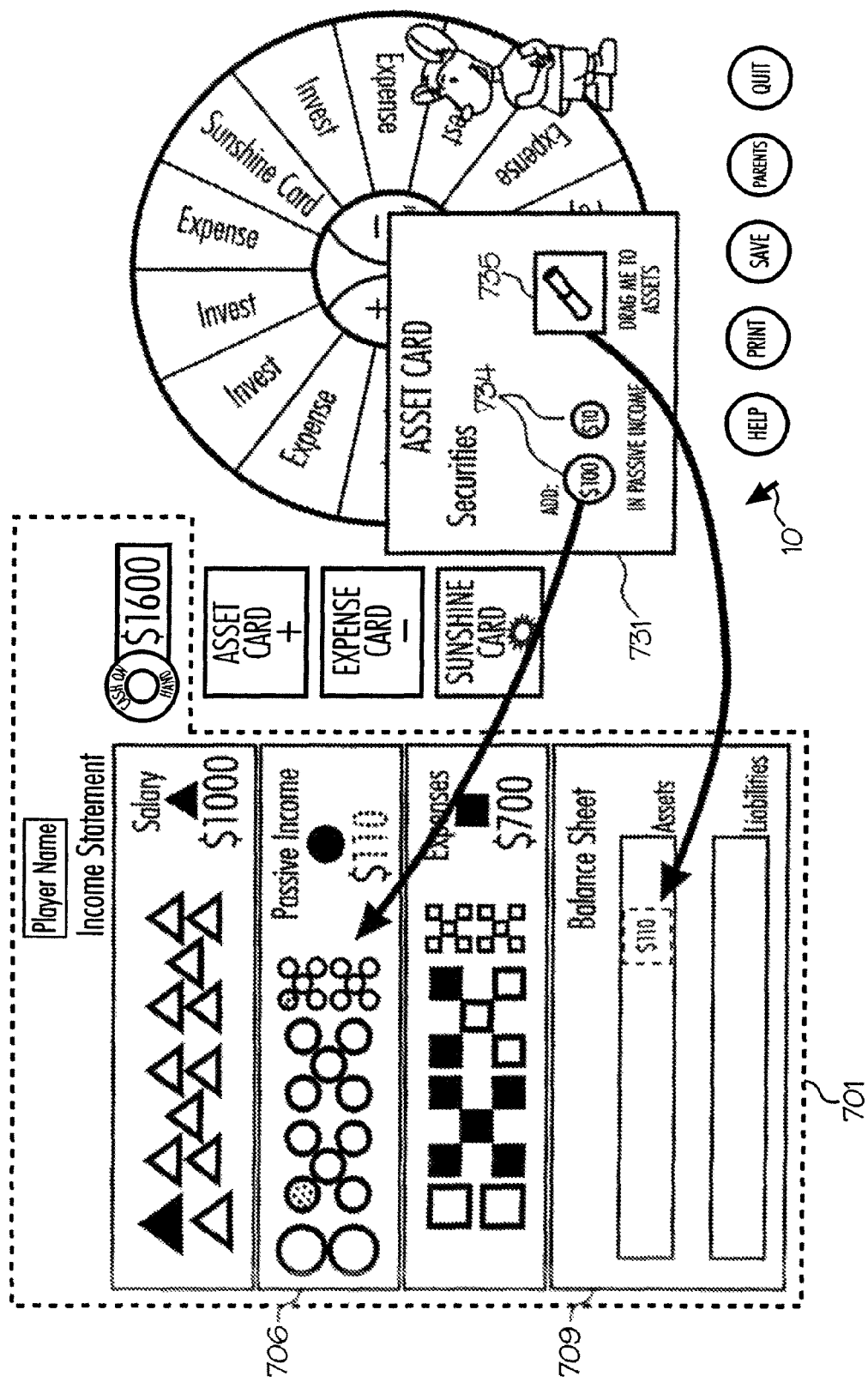
Figure 7F:
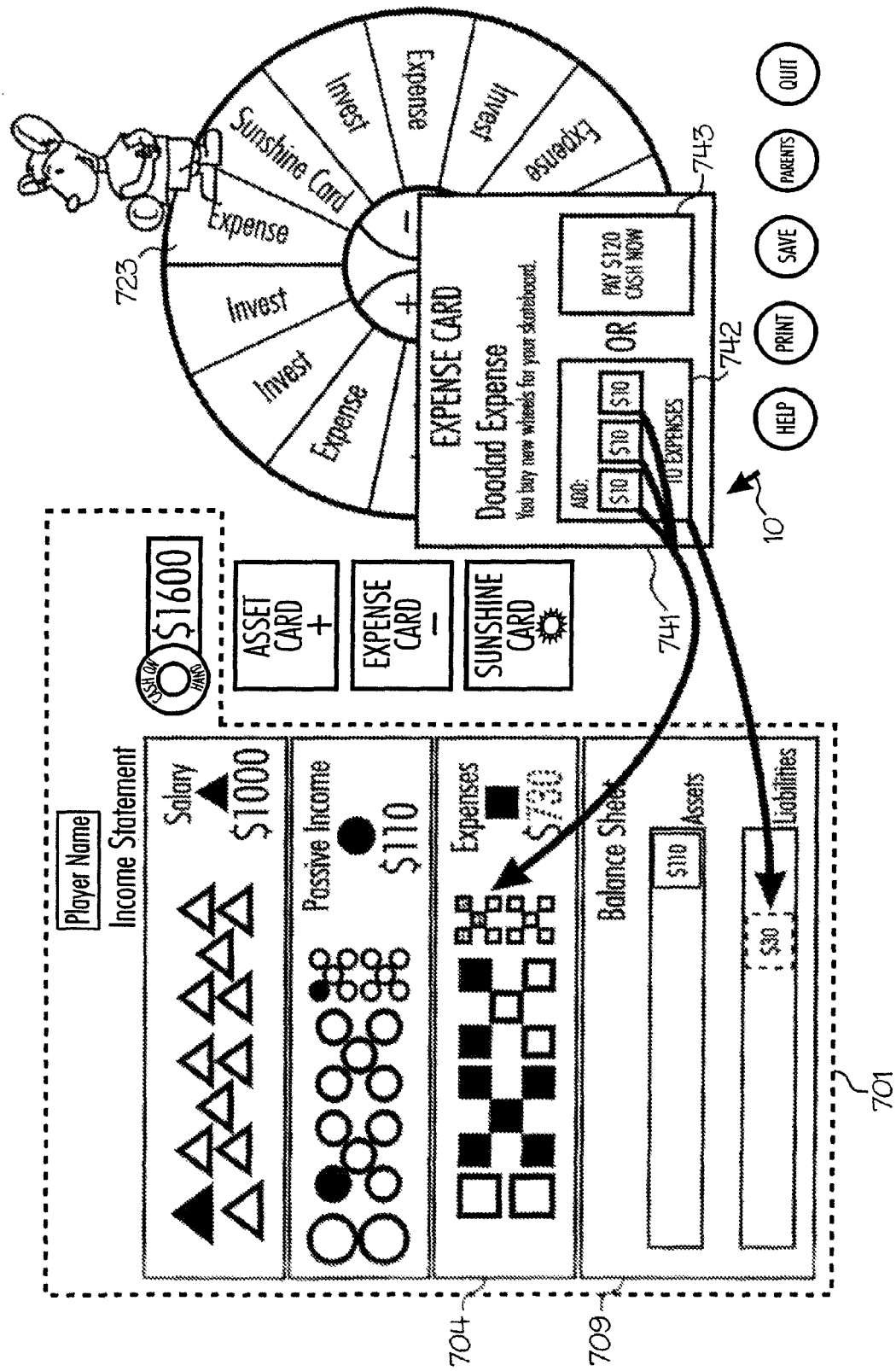

Play continues after paying for the item and removal of the user selectable payment indicia 760 from the screen by updating game event indicia 731 to reflect the purchased items (FIG. 7E). In preferred embodiments, the player drags passive income token indicia 734, representing the newly purchased passive income items, to appropriate spaces in passive income indicia 706 and the numerical amount of the player's passive income is updated accordingly. Additionally, the player drags a displayed asset indicia 735, representing the newly acquired asset, to a corresponding portion of asset and liabilities indicia 709 of balance sheet indicia 701. Once balance sheet indicia 701 are updated to reflect the encountered game event, the player's turn ends and play passes to the next player, if any.

In a similar fashion, when a player's character encounters a game space 723 of the Expenses game event category (FIG. 7F), Expense Card indicia 741 are displayed to the player. Expense Card indicia preferably include a textual description of the type of expense encountered, e.g., buy new wheels for your skateboard, and the option of: (i) paying for the expense over the course of time; or (ii) paying for the expense out of available cash on hand. The player may chose the manner of paying desired by selecting either add to expense indicia 742 or pay now indicia 743. Selectable payment indicia 742 and 743 may be presented using any visual representation and corresponding user interface code suitable for these purposes. In preferred embodiments, add to expense indicia include tokens corresponding to shapes of expenses indicia 704, in balance sheet indicia 701, e.g., red squares, as well as numerical identifiers identifying the dollar amount for each expense token.

If the player decides to add the expense to periodic expense indicia 704, the player selects add expense indicia 742, using for example, cursor 10, and then drags the corresponding tokens to provided spaces of expense indicia 704 and/or liability image (not shown) to the assets and liabilities section of. If however, the player selects "pay now" indicia 743, user selectable payment indicia 760 (FIG. 7D) are displayed to the player for paying the encountered expenses from cash on hand (not shown). By way of example, in the depicted embodiment (FIGS. 7F-7G), the player chose to add the incurred expenses to his/her periodic expense indicia 704 rather than pay it directly out of available cash on hand 708.

In the preferred embodiments, the other two game event spaces, i.e., Payday spaces 721 and Sunshine spaces 724, on game sequencer 720 are encountered by the player's character whenever they are landed on OR passed. This is optional but preferred in embodiments when there are fewer Payday spaces 721 and Sunshine spaces 724 than Expense spaces 723 and Investment spaces 722.

Figure 7G:
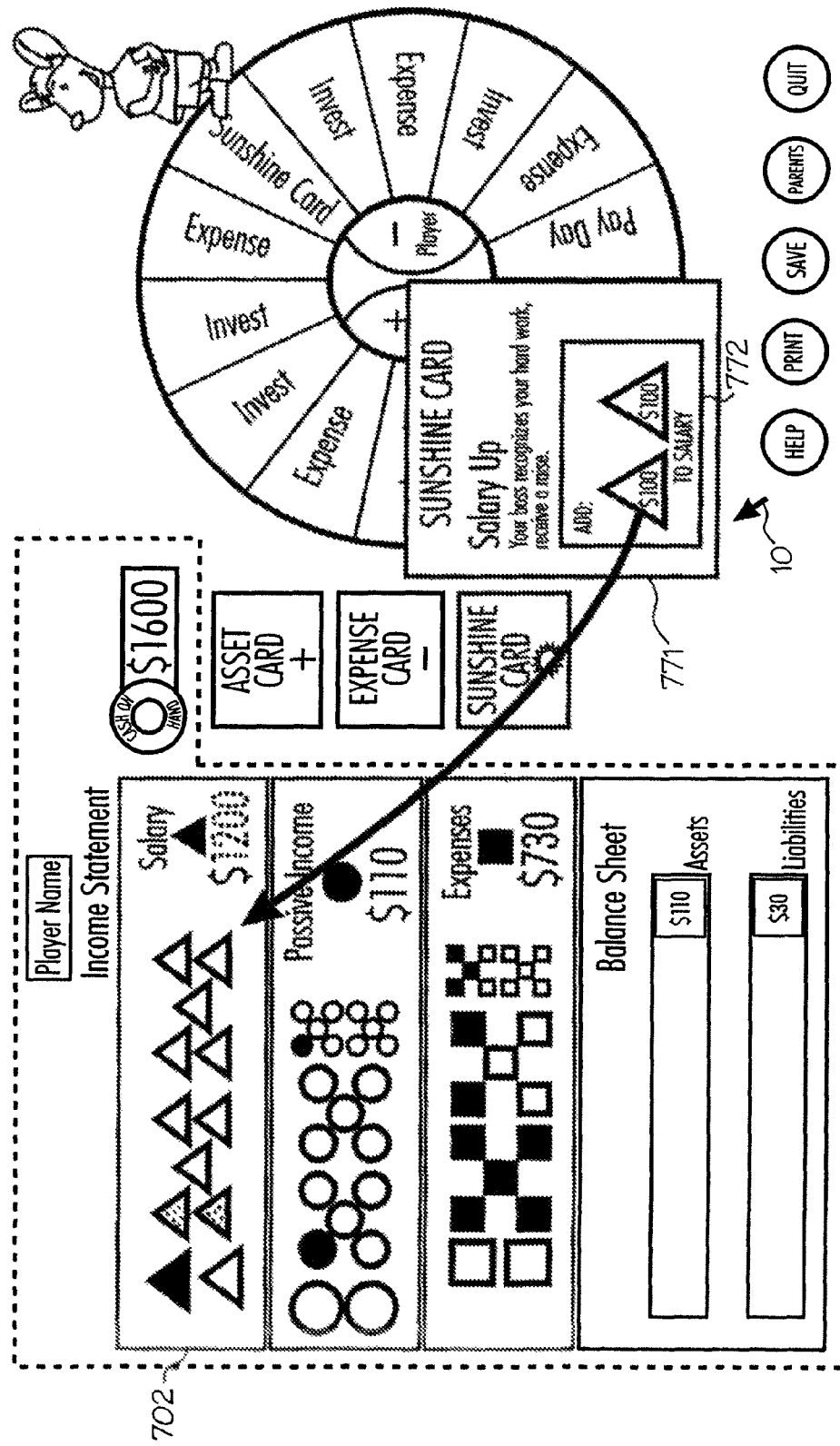

When a player passes or lands on blue Payday space 721, the player receives a net income into their cash on hand 708. The net income received equals the sum of the players earned income (represented by indicia 702) and passive income if any, (represented by indicia 706) less the player's expenses (represented by indicia 704). The player's cash on hand (indicia 708) is updated to reflect the net income; that is cash on hand is incremented by the net income if the player's total income exceeds his/her expenses and/or decremented by a net loss if the player's expenses exceed the total income When a player's character lands on or passes a Sunshine space 724, game 700 displays Sunshine Card indicia 771 to the player (FIG. 7G). Sunshine Card indicia 771 preferably includes a description of a random game event encountered by a player and one or more selector indicia 772 to enable the player to accept the random game event and continue on. Any visual image or combination of images as well as corresponding user interface code may be used that are suitable for these purposes. As shown in the depicted example of FIG. 7G, Sunshine Card indicia 771 indicates that the player has received a two hundred dollar raise in salary. The player is then prompted to select indicia 772 and drag tokens presenting the added salary to corresponding spaces in periodic income indicia 702.

Figure 7H:
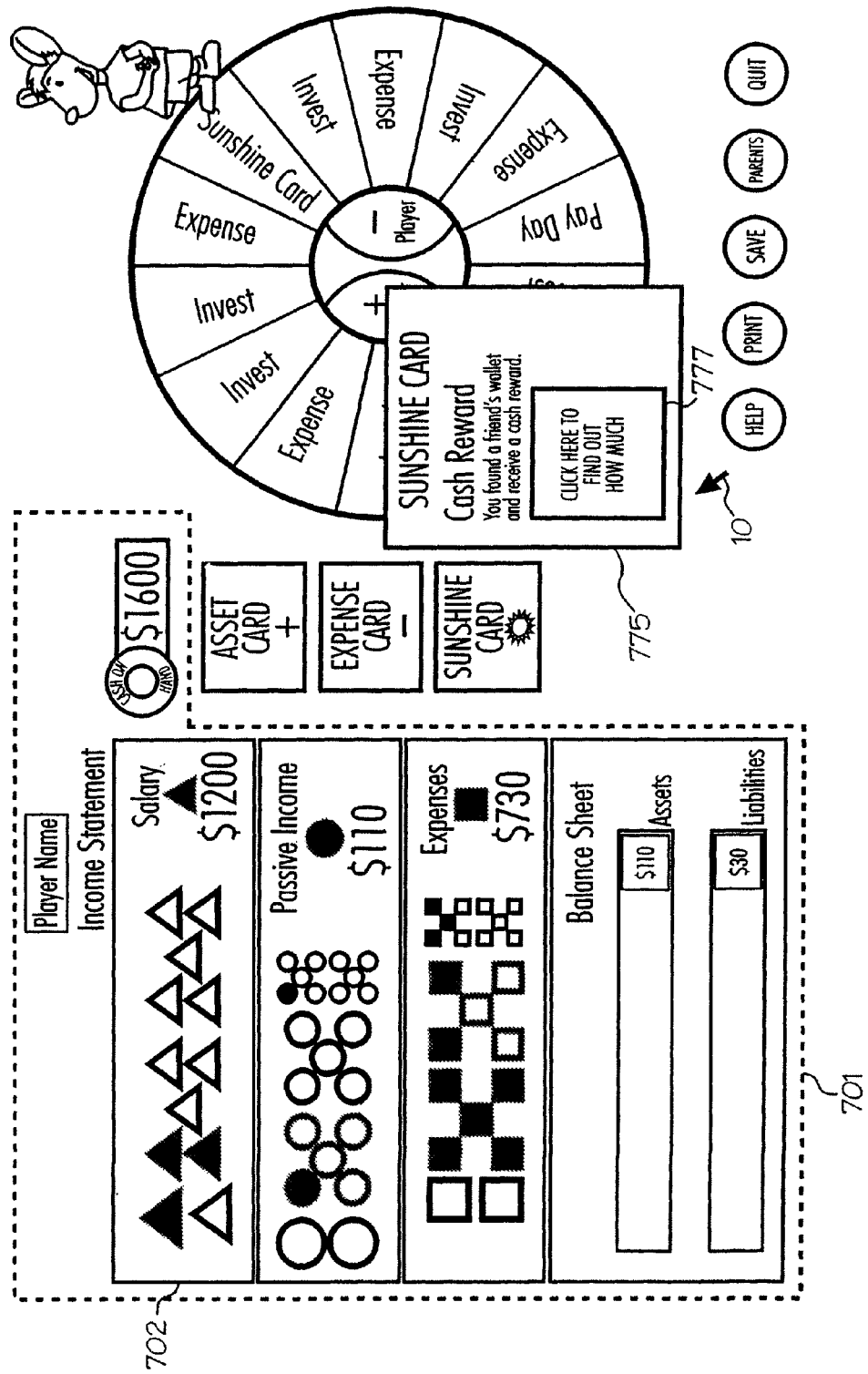
Figure 7I:
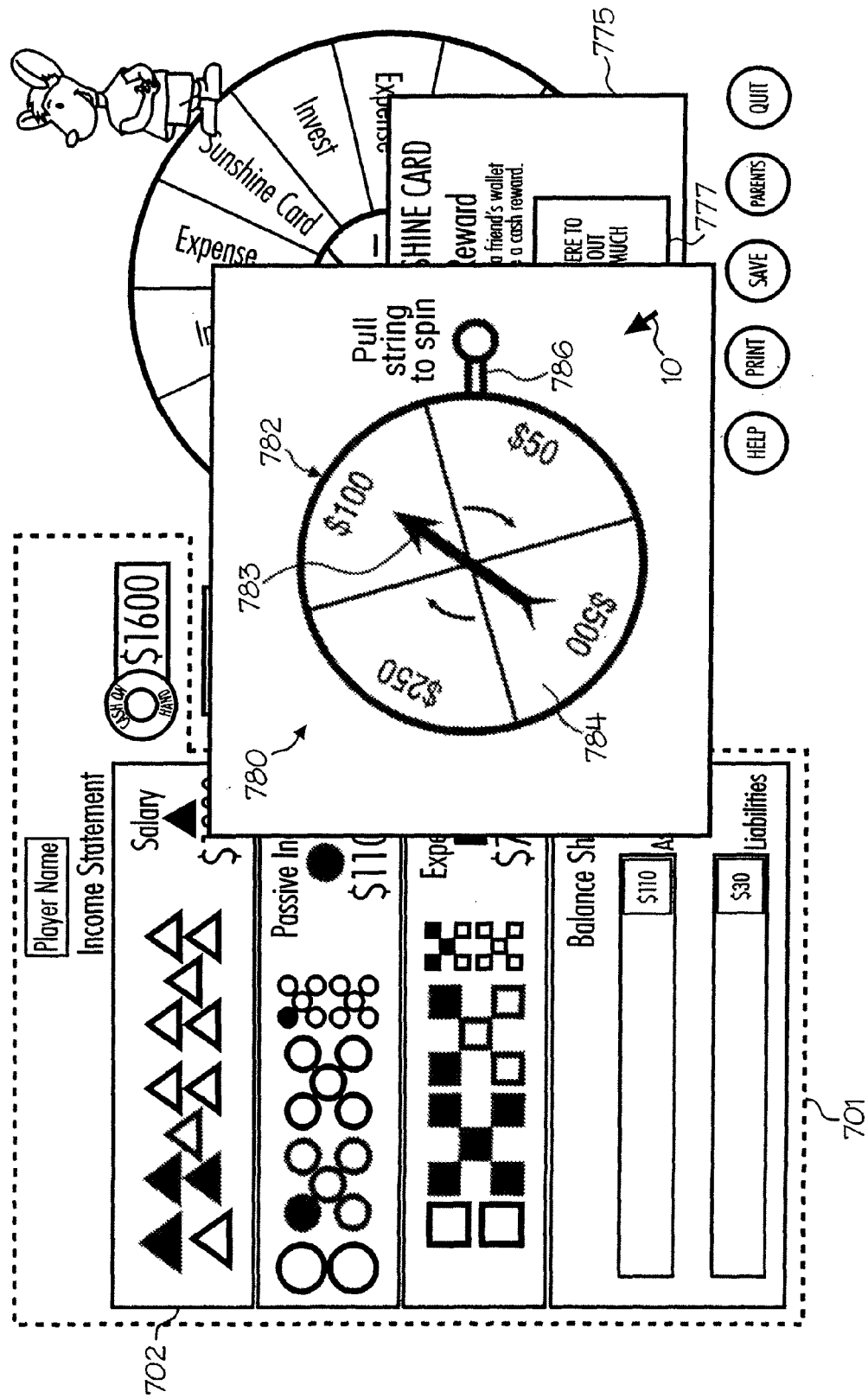

Turning to FIGS. 7H-7I, another type of Sunshine Card indicia 775, by way of example, informs the player via textual and/or audible indicia that the player will receive a cash reward for finding a lost wallet. The user is then prompted to select selector indicia 777, to find out how much cash the player will receive into his/her cash on hand. Upon selection of indicia 777, random cash award indicia 780 is presented to the user for randomly determining the amount for the reward (or other type of random cash award) (FIG. 7I). The user then initiates the random cash award indicia 780 to identify the amount of the cash award at random. Indicia 780 may be any image or combination of images, corresponding code for generating the images and functionality and, if desired accompanying audible sound to serve this purpose.

In a preferred embodiment random cash award indicia 780 comprises spinner indicia 782 including an animated needle 783 for animating the spinning, spinner background indicia 784 illustrating various cash award available to be awarded depending where needle 783 ends up, and a spinner initiation selector 786 for the player to initiate the movement of animated needle 783.

Sunshine events are unexpected events randomly selected by the game (based on random selection programming techniques). In preferred embodiments, Sunshine events are good things that may happen to a user throughout the course of game play. However, Sunshine events could also include any random event that happens to a player during game play, or another category of spaces for random bad events could be included on game sequencer 720.

A player wins when he/she has enough passive income (indicia 706) to pay for all expenses (indicia 704). In preferred embodiments, the player is notified that they have succeeded in obtaining financial freedom by having a greater passive income than their expensive but is allowed to continue playing if the player so desires.

Figure 7J:
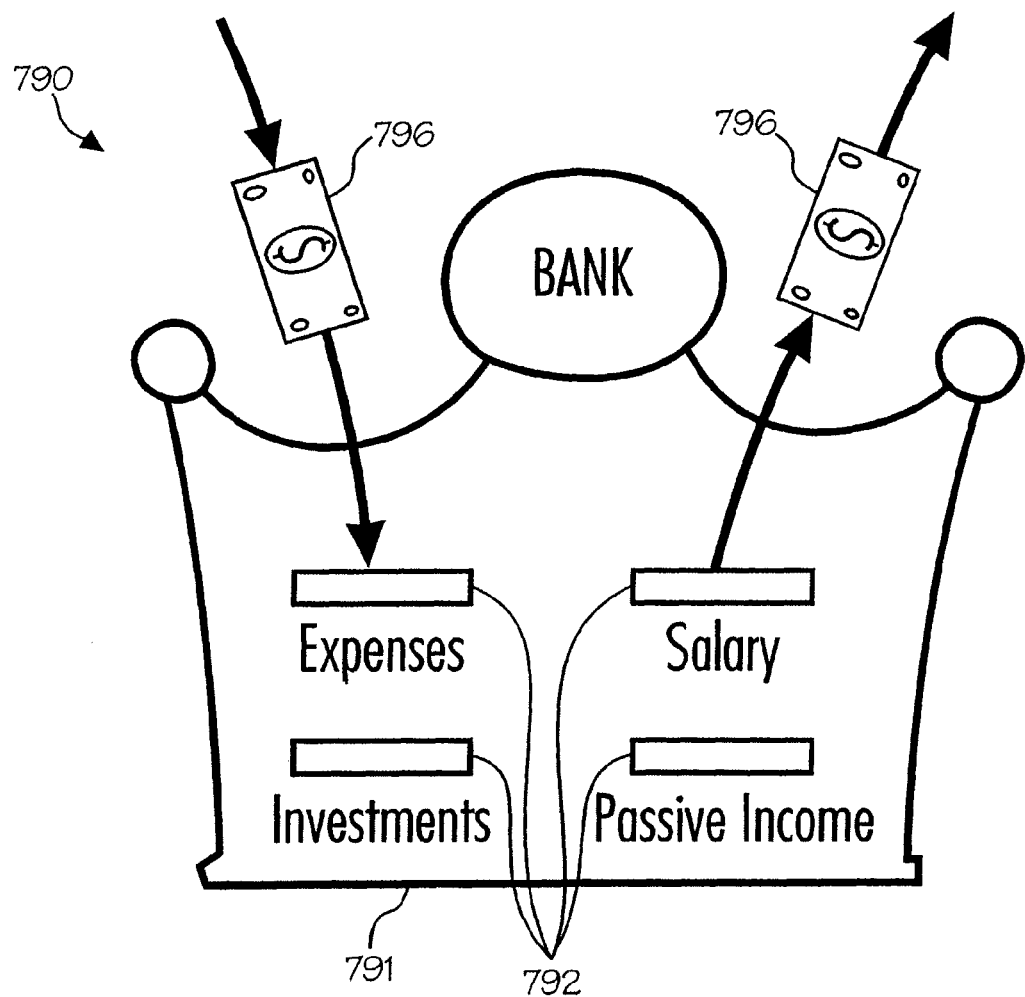

Turning to FIG. 7J, in certain embodiments of the invention, indicia 790 for representing an automated banker may be presented on the screen when financial transactions occur, e.g., when a player passes a payday space and receives income and/or when a player pays for an asset or expense. In the preferred embodiments, banker indicia 790 includes a background portion 791, one or more slots 792 corresponding to one or more banking aspects, for example, expenses, salary, investments and/or expenses, and one or more money indicia 796 animated to move between background portion 791 and the player's financial statement. In the most preferred embodiments, animated money indicia 796 is colored red going into the bank, for example for paying expenses and colored green when coming out of the bank and into the player's financial statement. When financial transactions are complete, banker indicia 790 are removed from the screen. This aspect of the invention demonstrates to the player where the player's money goes and where it comes from.

Differences between the Cashflow for Kids intermediate level of play (328; FIG. 3) and advanced level of play (329; FIG. 3) may include varying the difficulty of the game. Such variances might include: (i) varying data for game events to be more suitable for an older age group; (ii) more sophisticated financial terms and game events; (iii) increasingly difficult starting values, such as lower salary and higher starting expenses; (iv) increasingly difficult game event sequencing layout, such as more expenses spaces than investment spaces and others; and (v) adding additional types of game event categories.

In optional embodiments of the games described herein, an animated character, e.g., Toki, appears after each player's turn and complements the player on what they are doing well and/or points out potential problems with the player's balance sheet or strategy. By way of example, an image of Toki appears after a player's turn accompanied by an audible voice and says, "congratulations, you are doing well, you are increasing your passive income" or "be careful, you may not have enough carrots to lure the skunk away."

In preferred embodiments of the invention, the methods/games described herein are performed using a system described in reference to FIG. 1, wherein the media processed by processor 115 is a machine-readable code stored on media storage 130, 135. However, the present invention is not limited only to computer-based implementations. In fact the methods and games described herein may be implemented using traditional formats such as board games, card games and the like where applicable.

The machine-readable code in exemplary embodiments of the invention is produced on a CDROM, DVDROM or other memory medium using an interactive video presentation tool that enables the author to create user interactive presentations based on a scripting language. In the preferred embodiments, DIRECTOR version 8.5 available from MACROMEDIA, was used to create the code for the interactive educational games of the present invention.

Additionally, a lip sync tool was used for importing animated character lip sync files into a lip sync library referenced by the presentations prepared using DIRECTOR. DIRECTOR does not have any existing way to lip sync animated characters accurately. Consequently, the present inventors used a third party video-audio synchronization tool for synchronizing certain audio presentations of the educational interactive games with video animation. In particular, the mouth movements of the animated characters were synchronized with character voice files using a commercially available program known as MAGPIE Pro version 1.25 available from Third Wish Software and Animation. MAGPIE Pro outputs a text synchronization file that may be adapted to be referenced by a presentation created in DIRECTOR.

Unless contrary to physical possibility, the inventor envisions that (i) the methods and systems described herein may be performed in any sequence and/or combination; and (ii) the components or items of respective embodiments may be combined in any manner.

Although there have been described preferred embodiments of this novel invention, many variations and modifications are possible and the embodiments described herein are not limited by the specific disclosure above, but rather should be limited only by the scope of the appended claims and legal equivalents thereof.

What is claimed is:

1. A method for determining a user-specified sum of money, the method performed by a computer system operated by a user, the method comprising:
   presenting a respective set of symbols for each of a plurality of denominations, each symbol having an unselected appearance and a selected appearance, each set having a respective quantity of symbols;
   presenting a plurality of numeric values comprising:
   (i) a first total for all symbols selected; and
   (ii) a difference between a goal amount and the first total, and updating the plurality of numeric values in accordance with the received indicia of selection;
   receiving indicia of selection of a symbol, the selection being by the user;
   updating the respective appearance of a symbol in response to the received indicia of selection; and
   revising the respective quantity of symbols in each set so that no first particular set of a relatively lower denomination has zero unselected symbols when a second particular set of a relatively higher denomination has more than zero unselected symbols.

2. The method of claim 1, further comprising presenting additional unselected symbols corresponding to the difference in the case that the difference is greater than zero.

3. The method of claim 1, wherein the plurality of numeric values further comprises a second totally for all symbols presented.

4. The method of claim 2, wherein the plurality of numeric values further comprises a second total for all unselected symbols.

5. A method for determining a user-specified sum of money, the method performed by a computer system operated by a user, the method comprising:
   presenting a respective set of symbols for each of a plurality of denominations, each symbol having an unselected appearance and a selected appearance, each set having a respective quantity of symbols;
   receiving indicia of selection of a symbol, the selection being by the user;
   updating the respective appearance of a symbol in response to the received indicia of selection; and
   presenting a plurality of numeric values comprising:
   (i) a first total for all symbols selected; and
   (ii) a difference between a goal amount and the first total, and updating the plurality of numeric values in accordance with the received indicia of selection.

6. The method of claim 5, wherein the plurality of numeric values further comprises a second total for all symbols presented.

7. The method of claim 6 wherein the plurality of numeric values further comprises a second total for all unselected symbols.

* * * * *